(12) United States Patent
Kelly et al.

(10) Patent No.: US 12,339,369 B2
(45) Date of Patent: Jun. 24, 2025

(54) LIDAR SCANNING SYSTEM AND METHODS

(71) Applicant: AGI SURETRACK LLC, Lenexa, KS (US)

(72) Inventors: Luke Kelly, Lenexa, KS (US); Tianyu Lin, Lenexa, KS (US); Corey Barkhurst, Lenexa, KS (US); Chad Van Horn, Lenexa, KS (US); Mohammad Al-Shorman, Lenexa, KS (US)

(73) Assignee: AGI SURETRACK LLC, Lenexa, KS (US)

( * ) Notice: Subject to any disclaimer, the term of this patent is extended or adjusted under 35 U.S.C. 154(b) by 122 days.

(21) Appl. No.: 18/302,551

(22) Filed: Apr. 18, 2023

(65) Prior Publication Data

US 2023/0251382 A1  Aug. 10, 2023

Related U.S. Application Data

(63) Continuation of application No. 17/581,685, filed on Jan. 21, 2022, now Pat. No. 11,662,468.

(51) Int. Cl.
| | | |
|---|---|---|
| *G01C 3/08* | (2006.01) | |
| *G01F 22/00* | (2006.01) | |
| *G01F 23/292* | (2006.01) | |
| *G01S 7/481* | (2006.01) | |
| *G01S 17/89* | (2020.01) | |

(52) U.S. Cl.
CPC .............. *G01S 17/89* (2013.01); *G01F 22/00* (2013.01); *G01F 23/292* (2013.01); *G01S 7/4817* (2013.01)

(58) Field of Classification Search
CPC ........ G01S 17/89; G01S 7/4817; G01F 22/00; G01F 23/292
See application file for complete search history.

(56) References Cited

U.S. PATENT DOCUMENTS

| 4,318,627 A | 3/1982 | Morin |
|---|---|---|
| 10,890,210 B1 | 1/2021 | Yurman et al. |

(Continued)

FOREIGN PATENT DOCUMENTS

| CN | 109215110 A | 1/2019 | |
|---|---|---|---|
| CN | 111912357 A | * 11/2020 | ......... G01B 11/2518 |
| CN | 113916125 A | * 1/2022 | .............. G01B 11/00 |

OTHER PUBLICATIONS

International Search Report and Written Opinion received for PCT Patent Application No. PCT/US2022/032554, mailed on Sep. 2, 2022, 9 pages.

(Continued)

*Primary Examiner* — Mark Hellner
(74) *Attorney, Agent, or Firm* — Shook, Hardy & Bacon L.L.P.

(57) ABSTRACT

Computerized methods for determining a volume of an agricultural product in a container include using an image scanning system to determine a first and second point cloud of distance points. The distance points are classified as corresponding to one of the product or the container. The distance points classified as corresponding to the product are used to determine a volume change of the product. A topography of the product can also be isolated from the distance points classified as corresponding to the product, and the topography can be provided at an interview of a computing device.

18 Claims, 19 Drawing Sheets

(56) References Cited

U.S. PATENT DOCUMENTS

| | | |
|---|---|---|
| 11,067,116 B2 | 7/2021 | Sellers |
| 11,098,752 B2 | 8/2021 | Smith et al. |
| 11,126,937 B2 | 9/2021 | Tatge et al. |
| 11,137,019 B2 | 10/2021 | Rousseau et al. |
| 11,415,265 B1 | 8/2022 | Kelly et al. |
| 2006/0178578 A1 | 8/2006 | Tribble et al. |
| 2008/0304040 A1 | 12/2008 | Greenberg et al. |
| 2012/0240785 A1 | 9/2012 | Kelly |
| 2015/0029516 A1 | 1/2015 | Neundorf et al. |
| 2015/0160348 A1 | 6/2015 | Zweigle et al. |
| 2019/0056258 A1* | 2/2019 | Gelada Camps ... G01F 23/2928 |
| 2021/0278741 A1 | 9/2021 | Ziemkiewicz et al. |

OTHER PUBLICATIONS

Conditional Notice of Allowance received on Canadian Patent Application No. 3158780, mailed on Sep. 14, 2023, 3 pages.

"3D Laser Surface Mapping," Artemis Laser Scanning System, Ronin GMS, Retrieved from internet URL : https://www.roningms.com/images/documents/2013/Artemis%20Data%20Sheet.pdf, accessed on Jul. 2, 2022, pp. 2.

* cited by examiner

LIDAR SCANNING SYSTEM AND METHODS

CROSS-REFERENCE TO RELATED APPLICATIONS

This application is a continuation of U.S. application Ser. No. 17/581,685, entitled "Lidar Scanning System and Methods," filed on Jan. 21, 2022, the contents of which are expressly incorporated herein by reference in their entirety.

BACKGROUND

Grain bins have historically been used as a consolidation point for grain storage and as a method for drying grain prior to distribution. It is necessary to accurately measure the amount of grain inside a grain bin. This is particularly necessary during loading and unloading to determine the quantity of grain being distributed.

SUMMARY

At a high level, aspects described herein relate to an image scanning system and methods of use. Particular aspects relate to an image scanning system and methods for imaging product in a container, such as grain within a grain bin. Additional aspects of the disclosure relate to a locking mechanism for securing the image scanning system to the container.

The image scanning system provides an accurate way to measure product in a container. This is beneficial in applications such as grain bin monitoring because it provides a precise way to measure how much product is being distributed, which is necessary for farming and supply chain operations. To enhance the accuracy and precision for product measurement, the image scanning system uses a Light Detection and Ranging (LiDAR)-based image scanning device.

The image scanning device is used to generate point clouds of an area. To enhance the area over which the point clouds can be generate, and thus better determine volume and area information within the container, the image scanning device is comprised within an image scanning head of the image scanning system. The image scanning system further comprises a base housing and a securing arm.

The image scanning head is rotatably coupled to the base housing, and the base housing is rotatably coupled to the securing arm. The image scanning head is configured to rotate in a first direction about the base housing, while the base housing is configured to rotate in a second direction about the securing arm. The first direction is about perpendicular to the second direction. In this way, the image scanning device within the image scanning head can be positioned at any angle to determine position and distance information for distance points of a point cloud. The base housing may include motors, such as stepper motors, to rotate the image scanning head and the base housing.

For imaging, the image scanning head can include a window that is transparent to the radiation wavelength utilized by the image scanning device. A brush is included on the securing arm located at a position within a plane of rotation formed from rotation of the base housing about the securing arm. That is, the brush can extend parallel to the plane of rotation formed from rotation of the base housing about the securing arm. In some positions, when rotating the base housing, the window engages the brush so that the brush moves across the window during rotation. The brush helps shed debris that may block penetration of the radiation wavelength through the window.

The image scanning system is generally positioned within the container that it is imaging. To do so, the present disclosure also provides for a locking system that correctly positions the image scanning system when installed and locked in place.

The locking system comprises a first compressible material and a second compressible material. A first securing plate is disposed between the first and second compressible materials, and a second securing plate is positioned adjacent to a second compressible material top surface. In some cases, the first or second compressible material is affixed to the first securing plate.

The first securing plate comprises a first curved edge that forms a first securing plate opening perimeter edge around a first securing plate opening. The first curved edge curves in a first direction away from the second compressible material. The second securing plate comprises a second curved edge. The second curved edge curves in a second direction away from the second compressible material. A ball is position at least partially within the first curved edge and the second curved edge, and it is generally held rotationally in place by the first and second securing plates. A shaft can extend from the ball to the image scanning system.

To secure the image scanning system in place, the image scanning system is placed through an opening of the container, and the locking system is fastened to a surface, i.e., a securing surface, of the container. The fasteners extend through the first and second securing plates, and thus, when fastened, compress at least the second compressible material such that the first and second plates exert a force on the ball. The force exerted by the secured plates generally rotationally locks the ball in place, thereby locking the image scanning system into position.

This summary is intended to introduce a selection of concepts in a simplified form that is further described in the detailed description section of this disclosure. The summary is not intended to identify key or essential features of the claimed subject matter, nor is it an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1B:
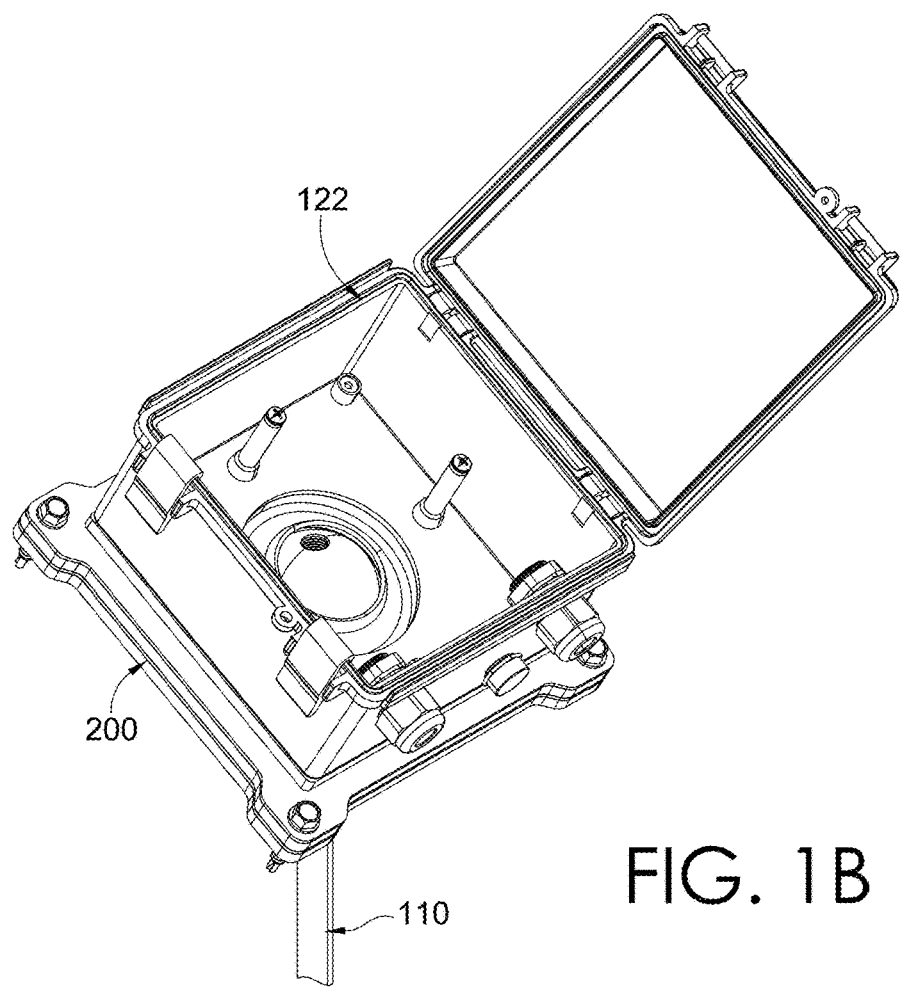
FIG. 1B is an example locking system that can be used to lock the image scanning system of FIG. 1A into position, in accordance with an aspect described herein.

In many industrial settings, bulk product measurement is key to supply chain operations. For instance, farming operations grow and harvest a product. In many cases, this product is consolidated and stored at central locations, such as silos, elevators, warehouses, and the like. It is important to accurately measure the amount of product in a container, especially when product is being added or removed from the container.

This disclosure provides an improved system for accurately and precisely measuring product in containers. As used herein, a container is generally any structure for holding a product. Containers can include warehouse floors, silos, elevators, bunkers, bins, and so forth. A product is intended to include anything agricultural or manufacturing product that can be held within a container. For instance in a grain elevator, the product may be grain. Products can include sugar, grain, legumes, seeds, beets, and the like stored in containers. As examples, a product may include grain within a grain bin, while a product may also include sugar piled on a warehouse or other structure floor. Thus, it will be understood that "container" and "product" are to be broadly interpreted.

In many cases, it can be challenging to accurately measure the volume, including a change in volume, of a product within a container. For example, existing methods of volume measurements for grain elevators include visual observation of a height measuring device running vertically along a silo wall. However, the accuracy is limited because product can form a cone shape when filled and may form a funnel shape when distributed from the base of the silo. Since the product is not flat, it can be challenging or impossible to account for these changes when making volumetric determinations.

Another traditional method includes weighing a product in the container and the amount removed from a container. This method, too, has limitations. Even product of a same product type can vary in density. For instance, a grain having more moisture will be denser than a grain having less moisture. Thus, when mixed in the container, it is challenging to determine a volume based on the product weight, since the density can fluctuate across the container. Moreover, in many agricultural operations, products are placed in containers to dry or cure after harvesting. In this instance, the density of the product changes over time. For these reasons, among others, weight-based measurements can introduce error when determining the amount of a product in a container. These errors propagate through the supply chain, since such errors, in many cases, may cause discrepancies between the amount of a product that has been listed on upstream harvest manifolds and the amount of product received by a downstream supplier.

To overcome these challenges, the present disclosure provides for an image scanning system that accurately and precisely provides volumetric measurements of products in a container.

One example of an image scanning system that achieves these benefits comprises an image scanning head that includes an image scanning device. The image scanning head is rotatably coupled to a base housing, and the base housing is rotatably coupled to a securing arm. The image scanning head rotates about the base housing in a first direction perpendicular to the rotation of the base housing about the securing arm. In this way, the image scanning device of the image scanning system can image in any direction.

The image scanning device comprised within the image scanning head can utilize LiDAR to image a surrounding area. In general, a LiDAR system, or other electromagnetic radiation-based image system, emits a radiation wavelength that is reflected from its surroundings and is detected by a detector of the image scanning device. This is translated into distance information that results in an "image," e.g., a point cloud, of the surrounding area, since the image scanning device can be rotated to any position by the image scanning system.

The image scanning system can be used to image and determine volumetric information for product in a container by placing the image scanning system within the container and initiating an image scanning process. Moreover, the image scanning system can be used as part of a comprehensive agricultural supply chain process to aid in tracking and measuring agricultural products from the field throughout the downstream supply chain. As part of this comprehensive product tracking and measurement process, the image scanning system can be used in coordination with other tracking and measuring devices for agricultural products. One such example is included in U.S. patent application Ser. No. 15/794,463, filed on Oct. 26, 2017, entitled "Farming Data Collection and Exchange System," granted as U.S. Pat. No. 11,126,937, which is expressly incorporated herein by reference in its entirety.

The image scanning system can be held in place within the container using a locking system. The locking system comprises a first compressible material and a second compressible material. A first securing plate is disposed between the first compressible material and the second compressible material, while a second securing plate is adjacent to a first compressible material top surface.

The first securing plate comprises a first curved edge that forms a first securing plate opening perimeter edge around a first securing plate opening. The first curved edge curves in a first direction away from the second compressible material. The second securing plate comprises a second curved edge that curves in a second direction away from the second compressible material. The first direction is opposite the second direction.

A ball is positioned within the curved edges of the first securing plate and the second securing plate. A shaft can be secured to the ball and extend away from the ball. In some cases, the shaft extends away from the ball in the first direction. The shaft can be used to hold the image scanning device within the container, while the locking system is secured to a securing surface, which can be a container surface on the outside of the container.

This locking system arrangement is beneficial because it allows the locking system to be placed at an angle, which occurs when the securing surface of the container has a pitch. However, the ball rotates and allows the shaft to naturally align perpendicular to level ground due to gravity.

The locking system can be fastened in place by fasteners that extend through the first securing plate and the second securing plate. When tightened, the fasteners compress at least the second compressible material, which decreases a distance between the first securing plate and the second securing plate. This causes the first securing plate and the second securing plate to exert a force on the ball, increasing the force required to rotate the ball, and thus move the shaft, to a different position. As such, the shaft is locked into position upon engaging and securing the fasteners of the locking system.

In operation, the image scanning system can perform a first scan of the areas within the container, including an area of the product in the container. Based on this scan, the image scanning system collects distance information in the form of a point cloud to different distance points within the container. Subsequent to completing the first scan, the image scanning system can be used to perform a second scan of the areas within the container. The change in the distance points of the point cloud can be used to determine a volume change of the product in the container, and this volume change can be provided to a computing device for display on an interface of the computing device.

It will be realized that the systems and methods previously described are only examples that can be practiced from the description that follows, which is provided to understand the technology and recognize its benefits more easily. Additional examples are now described with reference to the figures.

Figure 1A:
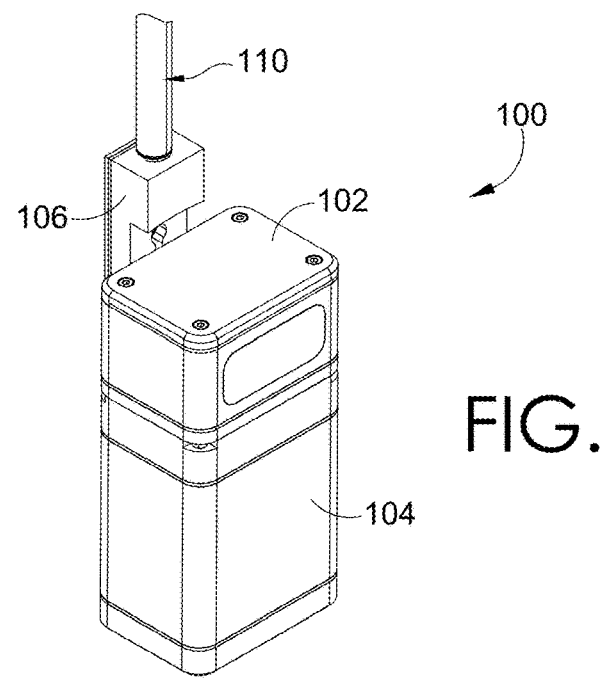
FIG. 1A is an example image scanning system, in accordance with an aspect described herein.

Referencing first FIG. 1A, an example image scanning system 100 is illustrated. As illustrated, image scanning system 100 comprises image scanning head 102, body housing 104, and securing arm 106. Securing arm 106 is illustrated as coupled to shaft 110 in the figure. It will be understood that image scanning system 100 of FIG. 1, and related figures, is provided as an example of the technology. The inventors contemplate that embodiments may have additional or fewer components, and may have different arrangements. However, providing each and every possibility would be impracticable.

Image scanning system 100 of FIG. 1A may be used to determine product volume and changes in product volume of a product in a container, among other applications. Some of which will be described in more detail throughout this disclosure. To do so, image scanning system 100 scans the contents of a container, including the walls and a product within a container. To scan the entire contents, image scanning system 100 rotates various components in different directions of rotation. In this way, components of image scanning system 100 can position an image scanning device in any direction to scan the product in the container, as will be further described.

To provide such a comprehensive scan, image scanning device 100 comprises image scanning head 102 which is rotatably coupled to body housing 104. Body housing 104 is rotatably coupled to securing arm 106. Image scanning head 102 is rotatably coupled to body housing 104 such that rotation of image scanning head 102 about body housing 104 occurs in a first direction. Additionally, body housing 104 is rotatably coupled to securing arm 106 such that rotation of body housing 104 about securing arm 106 occurs in a second direction. The first direction is about perpendicular to the second direction. In a specific case, the first direction is perpendicular to the second direction. By configuring the rotation of components of image scanning device 100 in this way, a face of image scanning head 102 can be angled in any direction to facilitate scanning the container and product.

Figure 2:
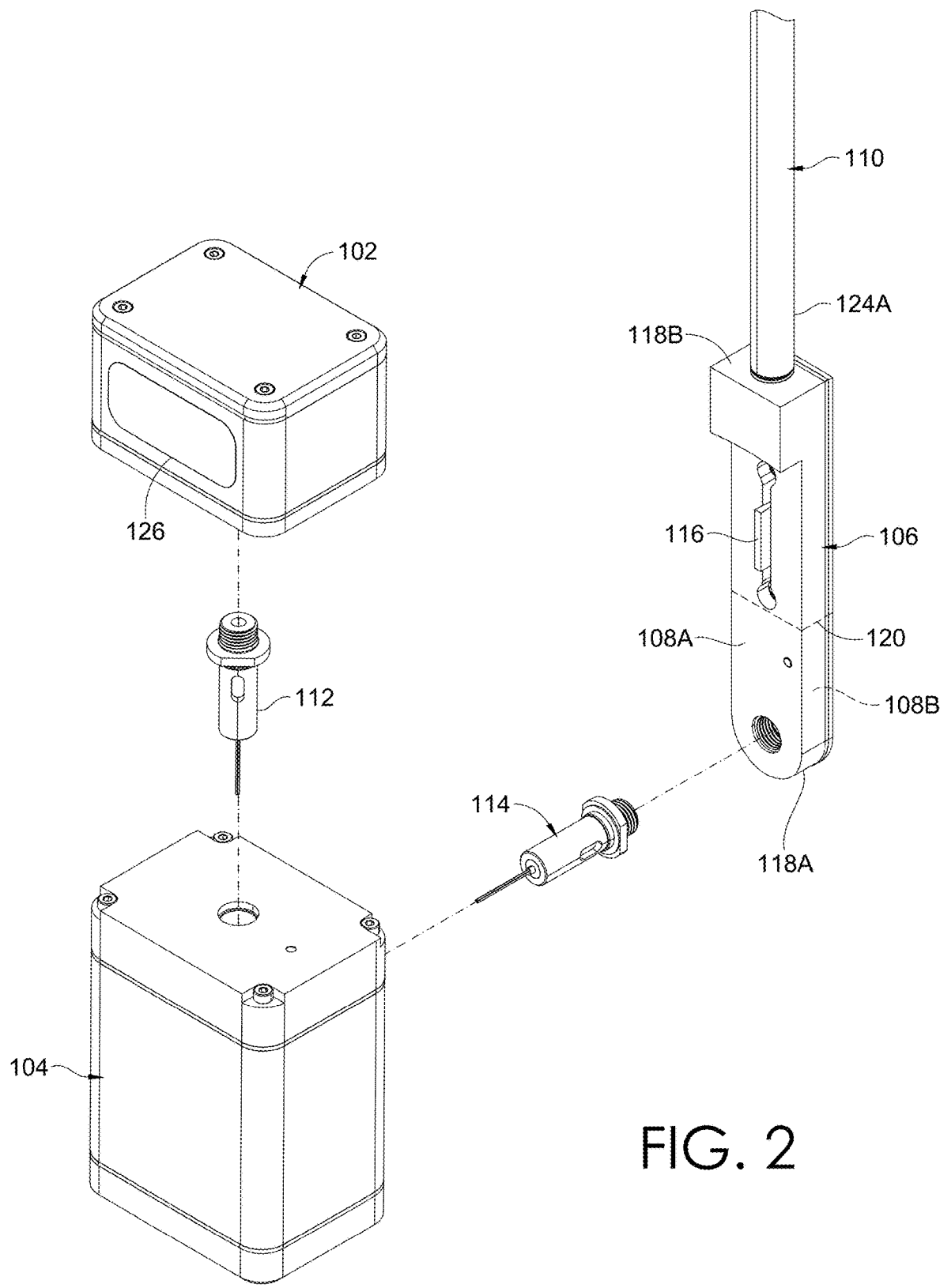
FIG. 2 is a partially exploded view of the image scanning system of FIG. 1A, in accordance with an aspect described herein.

FIG. 2 illustrates a partially exploded view of image scanning system 100 from FIG. 1A. In particular, FIG. 2 illustrates one example method of rotatably coupling image scanning head 102 to body housing 104, and body housing 104 to securing arm 106.

In the example illustrated by FIG. 2, image scanning head 102 is rotatably coupled to body housing 104 using first rotary joint 112. Further, the body housing 104 is rotatably coupled to securing arm 106 using second rotary joint 114. Some rotatory joints, such as first rotary joint 112 and second rotary joint 114 provide 360-degree bi-directional rotation, and such rotary joints are suitable for use in the present technology. These allow image scanning head 102 and body housing 104 to fully rotate in a first direction and a second direction, respectively. Moreover, bi-directional rotary joints allow each of the image scanning head 102 and body housing 104 to rotate forward and backward in the first direction and the second direction. Rotation of image scanning head 102 about body housing 104 creates a first plane of rotation, while rotation of body housing 104 about securing arm 106 creates a second plane of rotation about perpendicular, or perpendicular, to the first plane of rotation.

In aspects, rotary joints can be selected to facilitate communication between components of image scanning system 100, including communication messaging or power. That is communication or power can be transmitted through the rotary joints.

In the example illustrated, body housing 104 is coupled to securing arm 106 at first securing arm end 118A. That is, securing arm 106 comprises first securing arm end 118A opposite second securing arm end 118B. First securing arm end 118A is delineated from second securing arm end 118B using first theoretical dashed line 120. Securing arm 106 also comprises first securing arm side 108A and second securing arm side 108B opposite first securing arm side 108A. Body housing 104 can be coupled to securing arm 106 at first securing arm side 108A.

As further illustrated in FIG. 2, securing arm 106 comprises brush 116. Brush 116 is positioned on first securing arm side 108A. As will be described further, brush 116 is positioned to engage window 126 of image scanning head 102 during rotation. This helps remove any dust or debris that accumulates on window 126, which facilitates image scanning device 100 scanning a container or product. Put another way, brush 116 can be positioned within a second plane of rotation that is formed from rotation of body housing 104 about securing arm 106. In a specific configuration, brush 116 is oriented parallel with the second plane of rotation.

Securing arm 106 in FIG. 2 is shown coupled to shaft 110. In aspects where shaft 110 is separate from securing arm 106, first shaft end 124A of shaft 110 can be coupled to securing arm 106 at second securing arm end 118B. As will be understood, in the example image scanning system 100 shown, shaft 110 and securing arm 106 are separate components. In other embodiments, these can be the same components, and securing arm 106 and shaft 110 may generally illustrate regions of the single component.

While not illustrated, securing arm 106 may comprise a securing arm channel. The securing arm channel may open at a location corresponding to a location on first securing arm end 118A where base housing 104 is coupled to securing arm 106 via second rotary joint 114. The securing arm channel may extend through and within securing arm 106, and open at a location corresponding to a location where shaft 110 on second securing arm end 118B is coupled to securing arm 106. The securing arm channel may comprise a wire extending through the securing arm channel and engaging second rotary joint 114 to provide for communication or power to components within base housing 104 and image scanning head 102.

Figure 3:
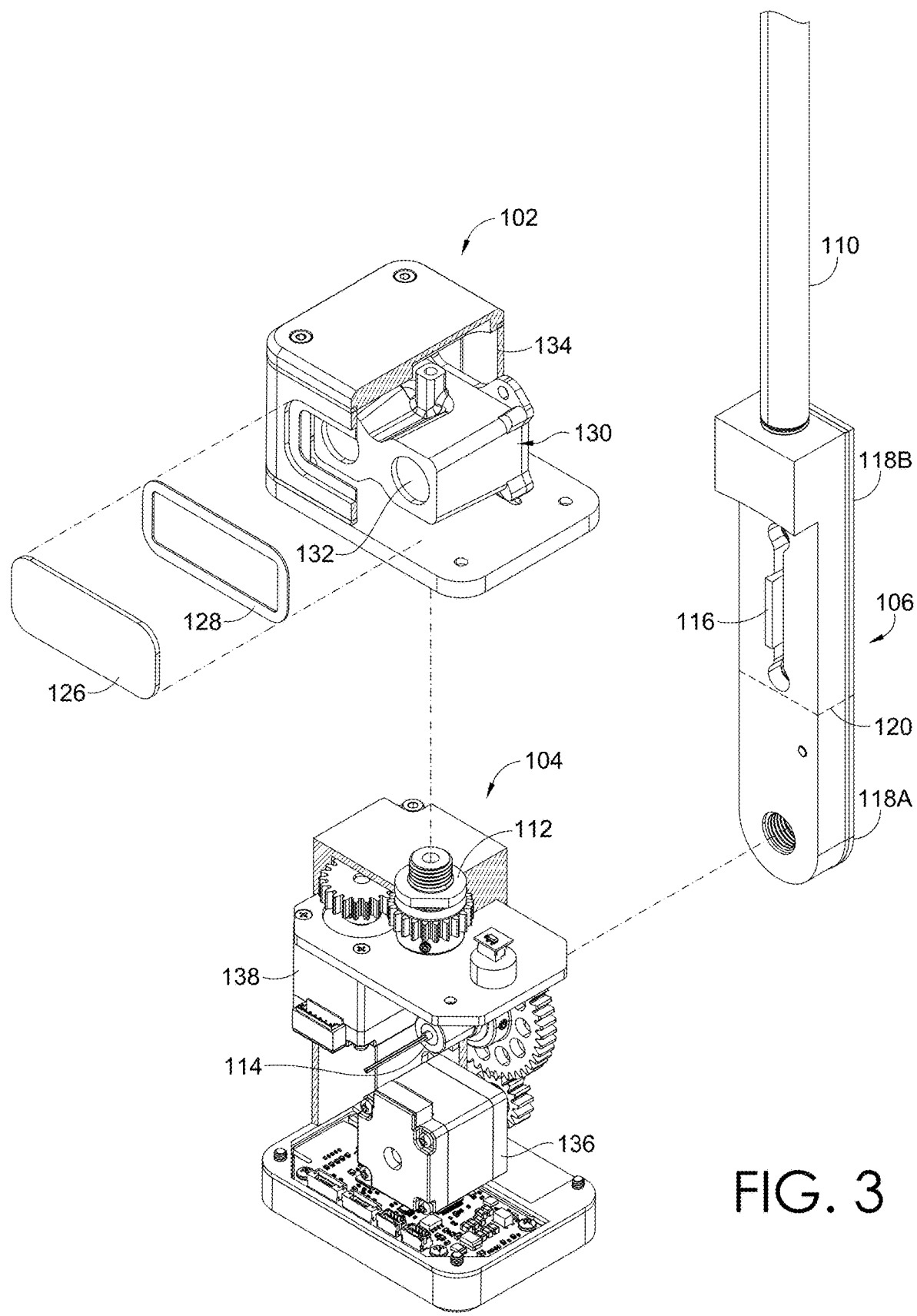
FIG. 3 is another partially exploded view of the image scanning system of FIG. 1A, in accordance with an aspect described herein.

FIG. 3 provides another partially exploded view of image scanning system 100 of FIG. 1A. Image scanning head 102 is illustrated as comprising window 126. Window 126 may comprise all of or a partial surface of a face of image scanning head 102. As will be described, window 126 can be coupled to an open area of the face of image scanning head 102. Window flange 128 can be used to facilitate coupling window 126 to image scanning head 102, in some configurations.

In general, image scanning head 102 comprises image scanning device 130. Image scanning device 130 is configured to measure distance using electromagnetic radiation. It is contemplated that any radiation wavelength in the electromagnetic spectrum can be used. For instance, LiDAR, radar (radio detection and ranging), and the like may be used with the present technology.

While various systems may be used, LiDAR has been found particularly suitable in the present technology. In general, a LiDAR system scans an area to determine positional information about objects in the scanned area. The particularities regarding how a LiDAR system functions to determine positional information is generally known in the art. However, in brief, and at a high level, most LiDAR systems comprise a laser ranging system. The range to an object is measured based on how long it takes an emitted light wave to reflect off the object and return to the LIDAR system.

To do so, image scanning device 130 emits a light source from an emitter, such as a laser emitter. The light can be any wavelength of the electromagnetic spectrum; however, common LiDAR systems use lasers emitting in a wavelength of 600-1000 nm. Some commonly used lasers include carbon dioxide lasers, neodymium-doped yttrium aluminum garnet lasers, semiconductor lasers, wavelength-tunable solid-states lasers, and so forth.

The emitted light source is projected into an area where it reflects off an object and returns back to the LiDAR system. In an example use case contemplated for the present technology, emitted light is reflected from the walls of a container and a product within the container.

To detect the reflected radiation, image scanning device 130 further comprises a detector, sometimes called a receiver. The time the light takes to return from the emitter to the detector provides the distance of the object reflecting the light. This can occur continuously, as the laser emitter emits light pulses at a particular frequency, such as 10,000 pulses per second. Scanning over different areas of a space provides the LiDAR system with the ability to map a three-dimensional space, and distance information is collected over the area.

Figure 9A:
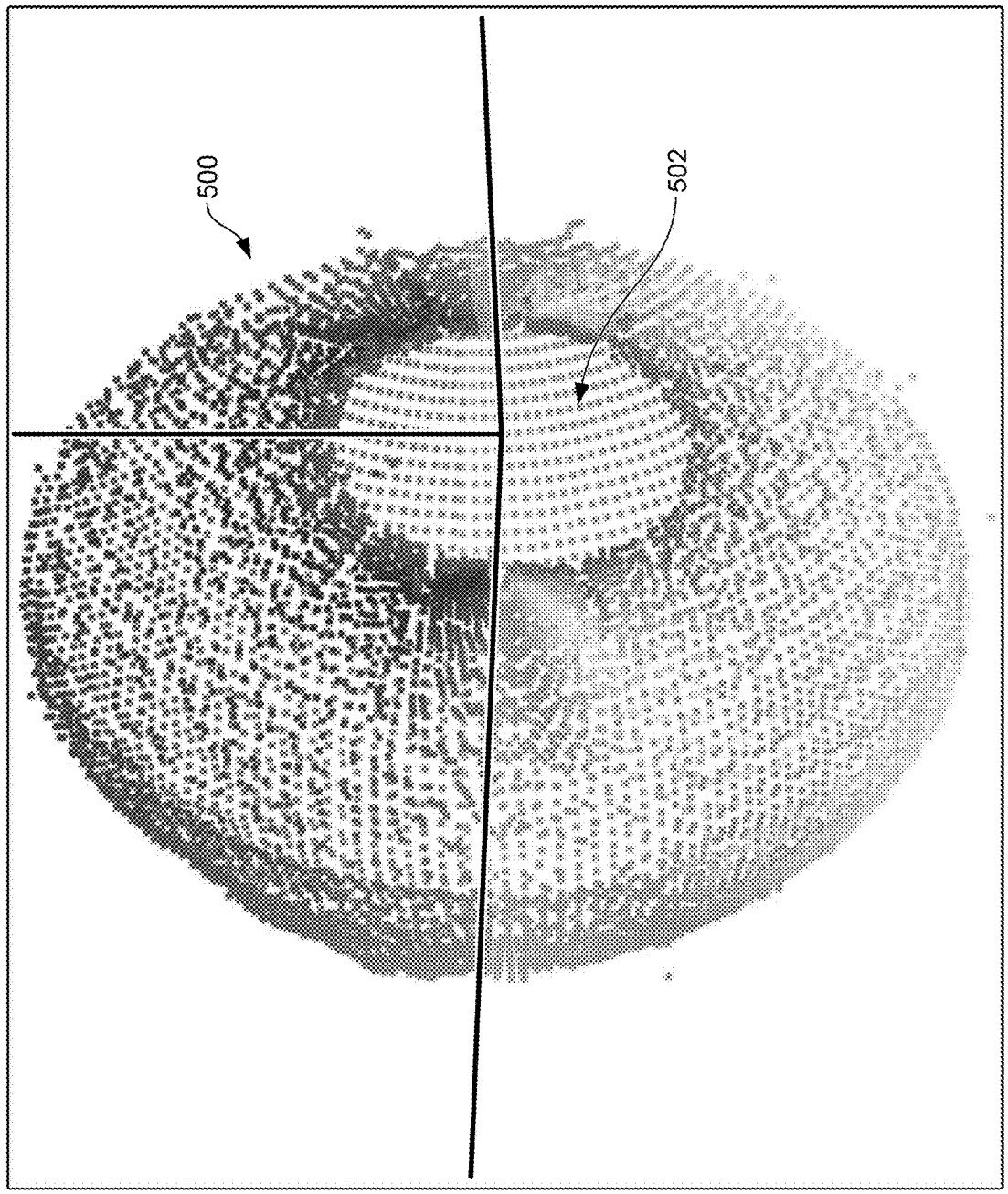
FIG. 9A is an example point cloud determined during a scan of a container using an image scanning device, such as the image scanning device of FIG. 1A, in accordance with an embodiment described herein.

In many cases, the resulting scan using image scanning device 130 generates points cloud of distance information to represent the three-dimensional space that is scanned. An example point cloud is illustrated in FIG. 9A as scan 500, illustrating how an empty volume of a cylindrical container can be generated by image scanning system 100 employing image scanning device 130.

To accomplish this, image scanning device 130 can be enclosed within image scanning head housing 134 of image scanning head 102. Image scanning device 130 can be secured within image scanning head housing 134 such that lens 132 of image scanning device 130 is aligned with window 126. Window 126 can be selected so that it is transparent to the wavelength emitted and detected by image scanning device 130.

While image scanning device 130 is described as comprising both an emitter and a detector, it will be understood that other arrangements may also be suitable, and such arrangements are contemplated to be within the scope of the present disclosure. For instance, an image scanning device that could be used may comprise either an emitter or a detector, and a corresponding emitter or detector for the particular radiation wavelength could be located within another component of an image scanning system or be a disparate and distinct component from the image scanning system of this embodiment.

As noted, to facilitate a three-dimensional scan of the space surrounding image scanning device 100, image scanning head 102 is maneuvered to face all of or a portion of the areas within the three-dimensional space being scanned. This can be done using rotation of image scanning head 102 about body housing 104 using first motor 136, and body housing 104 about securing arm 106 using second motor 138.

First motor 136 and second motor 138 can be any type of motor. Electric brushed or brushless motors are suitable. Some aspects of the technology determine a position of image scanning head 102 and body housing 104. One method of doing so uses stepper motors for first motor 136 and second motor 138, which provide positional information of the motor shaft, and in turn, image scanning head 102 relative body housing 104, and body housing 104 relative to securing arm 106.

In the aspects illustrated as image scanning system 100, first motor 136 and second motor 138 are enclosed within body housing 104. Here, first motor 136 is configured to rotate image scanning head 102 about body housing 104 by rotating a portion of first rotary joint 112. Second motor 138 is configured to rotate body housing 104 about securing arm 106 by rotating a portion of second rotary joint 114. However, it will be understood that other arrangements are suitable and are contemplated within the scope of this disclosure. For instance, one or more motors operable to rotate an image scanning head or a body housing can be comprised within the image scanning head. Similarly, one or more motors operable to rotate an image scanning head or a body housing may be comprised within a securing arm. Any combination of these arrangements is also contemplated.

As will be understood, rotation of image scanning head 102 about body housing 104 naturally has a first rotational axis. In the particular example illustrated, the first rotational axis extends through first rotary joint 112. Similarly, rotation of body housing 104 about securing arm 106 naturally has a second rotational axis. In this example, the second rotational axis extends through second rotary joint 114. In aspects, it is beneficial to have the first rotational axis extend though a first center of mass for image scanning head 102. The first center of mass can be positioned to align with the first rotational axis by applying counterweights to image scanning head 102. By positioning the first center of mass to align with the first rotational axis, the strain on first motor 136 is reduced. Likewise, it is also beneficial to have the second rotational axis extend through a second center of mass for image scanning head 102 and body housing 104. The second center of mass can be positioned to align with the second rotational axis by applying counterweights to image scanning head 102 or body housing 104. By positioning the second center of mass to align with the second rotational axis, the strain on second motor 138 is reduced.

FIGS. 4A-4E provide a series of illustrations showing a perspective view of image scanning system 100 of FIG. 1A during rotation of image scanning head 102 in a first direction and body housing 104 in a second direction. Using a series of rotations such as these, a face of image scanning head 102 comprising window 126 can be positioned in any direction to generate a three-dimensional scan within a container.

Figure 4C:
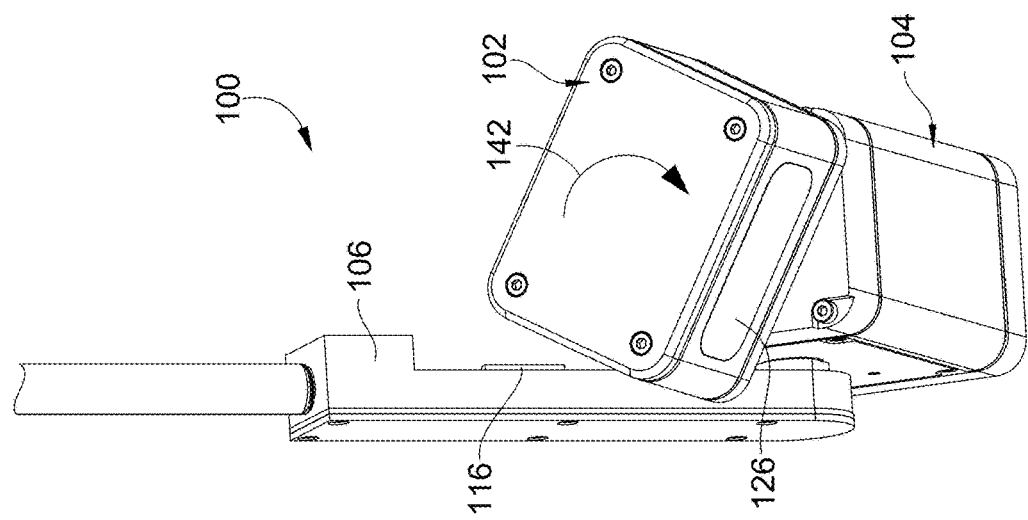
FIGS. 4A-4E is a series of illustrations showing a perspective view of the image scanning system of FIG. 1A during rotation in a first direction and a second direction, in accordance with aspects described herein.
Figure 4B:
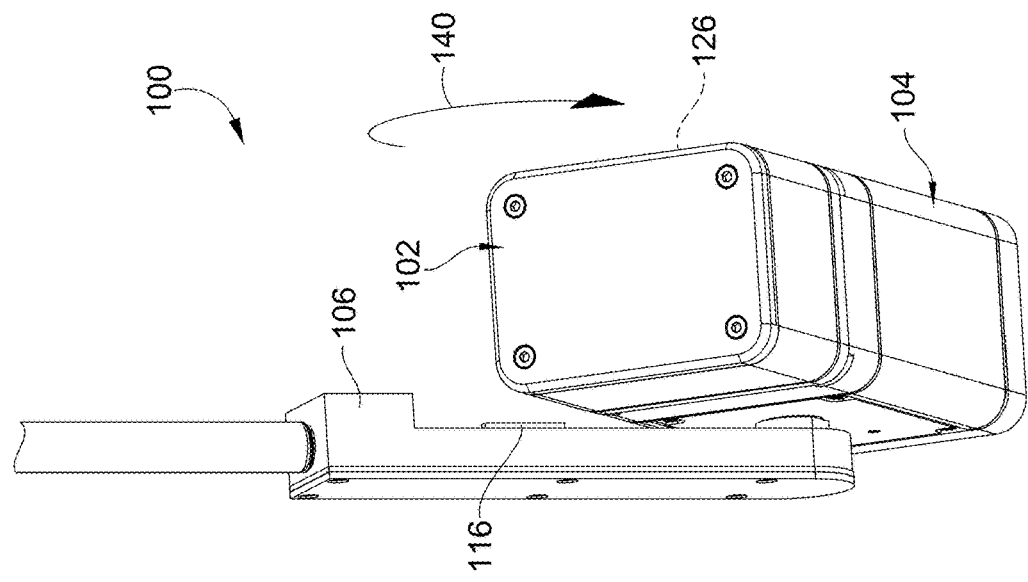
Figure 4A:
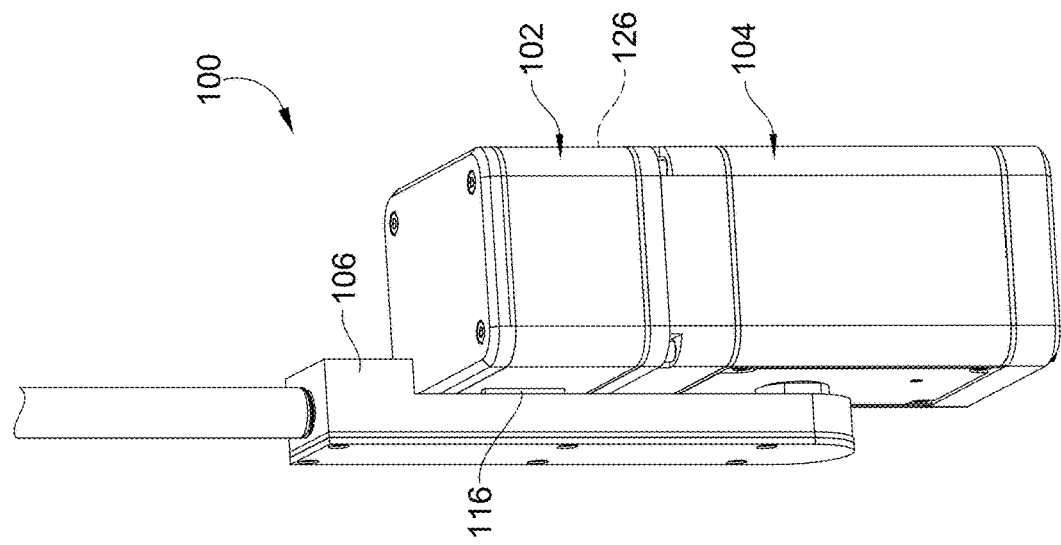

Starting at FIG. 4A, image scanning system 100 is at a position where body housing 104 is upright and parallel to securing arm 106. Image scanning system 100 can rotate body housing 104 about securing arm 106 forward or backward in a second direction, which is illustrated by the transition of the position of body housing 104 from FIG. 4A to FIG. 4B. The rotation of body housing 104 about securing arm 106 in the second direction forms a second plane of rotation, illustrated by curved arrow 140, which also illustrates the direction of rotation of body housing 104 in the second direction via the second arrow direction.

Looking to FIG. 4C, the illustration shows rotation of image scanning head 102 about body housing 104 in a first direction. Image scanning system 100 can rotate image scanning head 102 about body housing 104 forward or backward in a first direction. In the starting position in FIG. 4B, a face of image scanning head 102 is facing in a forward direction away from securing arm 106. As image scanning head 102 is rotated in the first direction, the face comprising window 126 begins to rotate away from the forward direction and toward a rearward direction that faces securing arm 106, illustrated in process by the transition of image scanning head 102 from the position illustrated in FIG. 4B to the position illustrated in FIG. 4C. The rotation of image scanning head 102 about body housing 104 in the first direction forms a first plane of rotation, illustrated by second curved arrow 142, which also illustrates the direction of rotation of image scanning head 102 in the second direction via the first arrow direction.

Figure 4E:
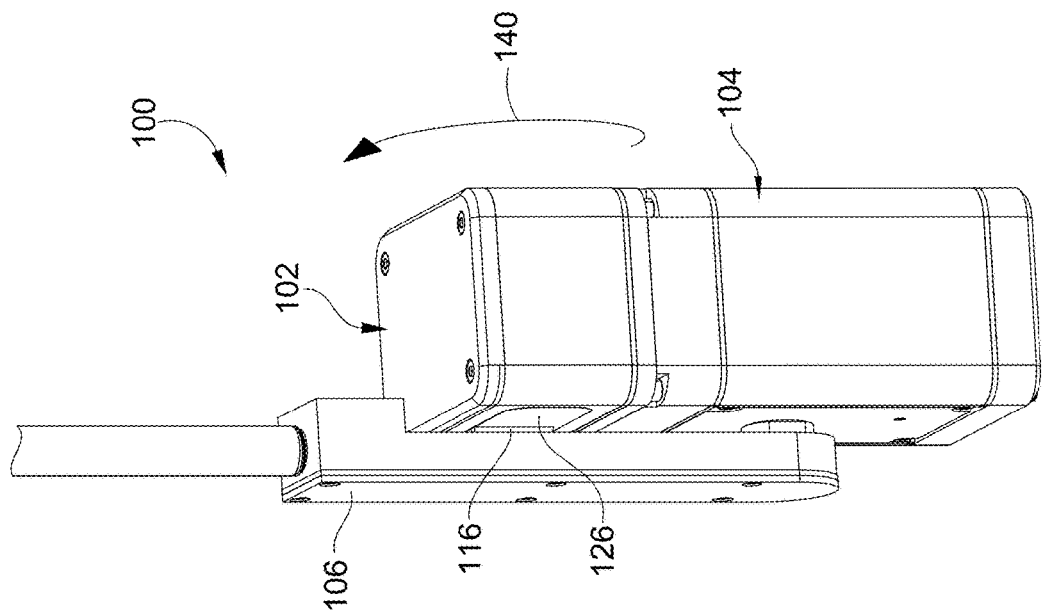
Figure 4D:
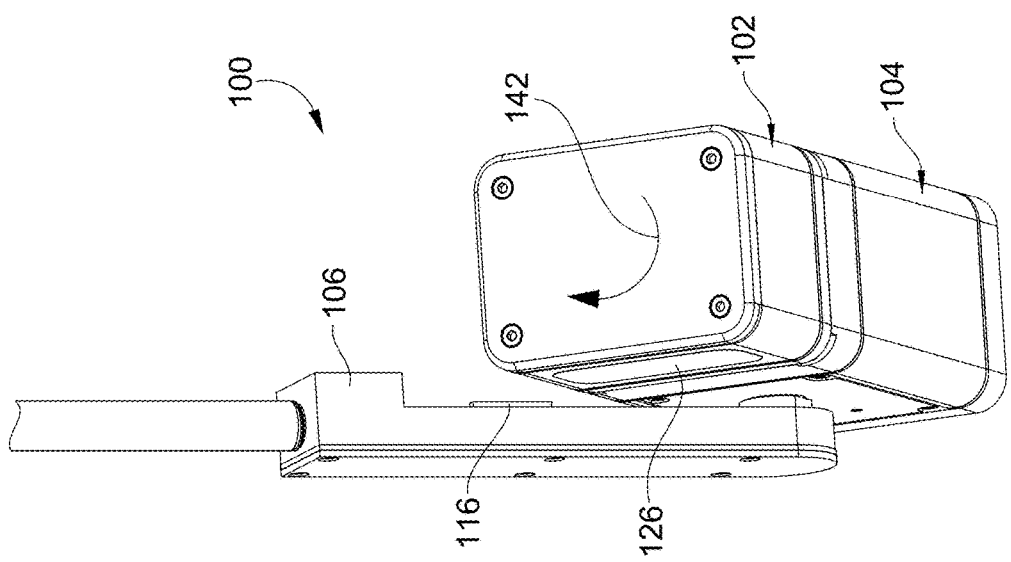

FIG. 4D illustrates image scanning head 102 completing a 180-degree rotation from the starting position in FIG. 4A and FIG. 4B so that a face comprising window 126 faces rearward toward securing arm 106. In this illustration, image scanning head 102 continues to rotate within the first plane of rotation, shown by second curved arrow 142.

Transitioning from FIG. 4D to FIG. 4E, body housing 104 is showing continuing rotation with the second plane of rotation, illustrated by second curved arrow 140. In this example, body housing 104 has reversed to move backward in the first direction, as illustrated by the second arrow direction of second curved arrow 140. As illustrated, in the position, window 126 engages brush 116 positioned on securing arm 106. Window 126 is swept along brush 116 by rotation of body housing 104 about securing arm 106 in the second direction. If there is dust or debris on window 126, it is removed by brush 116 during engagement of window 126 with brush 116 as body housing 104 rotates about securing arm 106.

It should be understood that FIGS. 4A-4E illustrate an example of the rotation that can be performed by components of image scanning system 100. As noted, in some aspects, image scanning head 102 can rotate forward and backward about base housing 104 throughout 360 degrees of rotation in the first direction. Similarly, base housing 104 can rotate forward and backward about securing arm 106 throughout 360 degrees of rotation in the second direction. Any combination of movement or positions resulting from this configuration is intended to be within the scope of the disclosure.

As described, image scanning system 100 can be used to scan a container and product within a container. In some aspects, to do so, image scanning system 100 is positioned within a container and locked (e.g., stabilized) into place using a locking system, such as locking system 200 provided in FIG. 1B.

Locking system 200 can be used in conjunction with image scanning system 100 of FIG. 1A. However, it will be understood that locking system 200 may have other applications as well. Locking system 200 provides some additional advantages. In particular, locking system 200 provides one way to naturally orient image scanning device 100 into a position for scanning the inside of a container. Moreover, locking system 200 can be used on pitched surfaces, such as the roof of a container, and will naturally orient image scanning device 100, or any other object, into the correct position due to gravity acting on the mass of image scanning device 100. Once in position, locking system 200 can be "locked" to stabilize image scanning device 100 into the position.

It should be understood that locking system 200 is only an example that can be made using the description of the present technology. Other arrangements, including additional or fewer components are also contemplated and intended to be within the scope of the present disclosure.

Locking system 200 is illustrated having first compressible material 202. First compressible material 202 comprises first compressible material top surface 252 and first compressible material bottom surface 254. Locking system 200 also comprises second compressible material 206. Second compressible material 206 comprises second compressible material top surface 260 and second compressible material bottom surface 262.

Locking system 200 further comprises first securing plate 204. First securing plate 204 comprises first securing plate top surface 256 and first securing plate bottom surface 258. Locking system 200 also comprises second securing plate 208. Second securing plate 208 comprises second securing plate top surface 264 and second securing plate bottom surface 266.

First securing plate 204 is disposed between first compressible material 202 and second compressible material 206. First securing plate 204 is disposed between first compressible material top surface 252 and second compressible material bottom surface 262. In some cases, first securing plate 204 is disposed between and adjacent to first compressible material top surface 252 and second compressible material bottom surface 262. In some aspects, first compressible material 202, second compressible material 206, or both are affixed to first securing plate 204. In some aspects, first compressible material 202, second compressible material 206, or both are spaced apart from first securing plate 204, and held in position with fasteners, such as those that will be further described.

Second securing plate 208 is positioned adjacent second compressible material 206 opposite first securing plate 204. Adjacent here includes second securing plate 208 being next to second compressible material 206 without another object between second securing plate bottom surface 266 and second compressible material top surface 260. Adjacent can include directly contacting or spaced apart without another object between the components.

First compressible material 202 can comprise first compressible material perimeter edge 212 defining first compressible material opening 214. First compressible material opening 214 can be located at a central position of first compressible material 202.

Second compressible material 206 can comprise second compressible material perimeter edge 222 defining first compressible material opening 224. Second compressible material opening 224 can be located at a central position of second compressible material 206.

First securing plate 204 comprises first curved edge 216. By "curved," it is meant that a portion of first securing plate 204 or another component affixed to first securing plate 204 deviates in a direction away from a plane across which first securing plate 204 extends. In cases, first curved edge 216 extends away from the plane across which first securing plate 204 extends at an angle less than 90 degrees. To further assist in locking, and apply a force to ball 234, as will be described in more detail, first curved edge 216 extends away from the plane across which first securing plate 204 extends at an angle of equal to or less than 45 degrees.

First curved edge 216 can form a first securing plate opening perimeter edge 218 that defines a first securing plate opening 220. In aspects, first securing plate opening perimeter edge 218 is positioned inward from first securing plate perimeter edge 246 that comprises an outer terminal edge of first securing plate 204. As illustrated, first curved edge 216 may curve in a first direction away from second compressible material 206. In some cases, first curved edge 216 may curve into first compressible material opening 214.

Second securing plate 208 comprises second curved edge 226. Similarly, a portion of second securing plate 208 or another component affixed to second securing plate 208 deviates in a direction away from a plane across which second securing plate 208 extends. Similarly, second curved edge 226 extends away from the plane across which second securing plate 208 extends at an angle less than 90 degrees. To further assist in locking, and apply a force to ball 234, as will be described in more detail, second curved edge 226 extends away from the plane across which second securing plate 208 extends at an angle of equal to or less than 45 degrees.

Second curved edge 226 can form a second securing plate opening perimeter edge 228 that defines a second securing plate opening 230. In aspects, second securing plate opening perimeter edge 228 is positioned inward from second securing plate perimeter edge 248 that comprises an outer terminal edge of second securing plate 208. As illustrated, second curved edge 226 may curve in a second direction away from second compressible material 206. In some cases, first curved edge 216 may curve into flange opening 232 of flange 210. As shown by first curved edge 216 and second curved edge 226, the first direction is opposite the second direction.

While the aspect illustrated comprises a layering of first compressible material 202, first securing plate 204, second compressible material 206, and second securing plate 208, it should be noted that some aspects of the technology might have different arrangements, with more or fewer components. For instance, it is contemplated that first securing plate 204 and second securing plate 208 could be arrangement adjacent to one another, e.g., without having second compressible material 206 disposed between them. In such aspects, another material or no material at all may be positioned between first securing plate 204 and second securing plate 208.

Figure 6A:
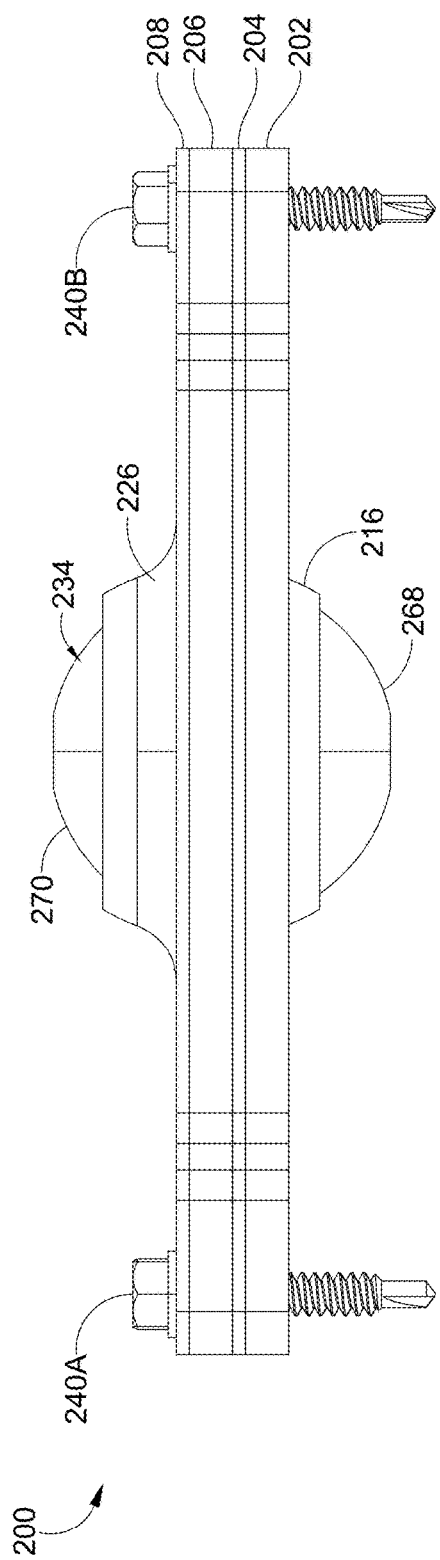
FIG. 6A is a side view of the locking system of FIG. 1B, in accordance with an aspect described herein.

Ball 234 can be positioned at least partially within first curved edge 216 or second curved edge 226. Turning briefly to FIG. 6A, FIG. 6A illustrates a side view of locking device 200. As shown, ball 234 is positioned at least partially within first curved edge 216 and second curved edge 226. This is also illustrated in the cross-sectional side view shown in FIG. 6B. All of or a portion of ball 234 can be positioned between first curved edge 216 and second curved edge 226. In aspects where ball 234 is partially positioned within first curved edge 216 and second curved edge 226, first ball end 268, which is opposite second ball end 270, may extend through first securing plate opening 220 of first securing plate 204. In some cases, second ball end 270 may extend through second securing plate opening 230 of second securing plate 206. To facilitate positioning ball 234 within first curved edge 216 and second curved edge 226, a diameter of ball 234 can be greater than a diameter of each of first securing plate opening 220 and second securing plate opening 230.

In aspects, ball 234 is coupled to shaft 110. As described, embodiments of the technology comprise shaft 110 that couples locking device 200 to an image scanning device, such as image scanning device 100 of FIG. 1A. Shaft 110 comprises first shaft end 124A that extends to second shaft end 124B. Shaft 110 can be a hollow shaft comprising a shaft channel that opens at each of first shaft end 124A and second shaft end 124B. In this arrangement, shaft 110 is coupled at second shaft end 124B to first ball end 268 of ball 234. Shaft 110 is coupled such that a shaft channel opens into ball channel 272, which extends from first ball end 268 though a center of ball 234 to second ball end 270. As will be described, the shaft channel and ball channel 272 may facilitate communication between components by permitting a wire for communication or power to extend through ball channel 272 into the shaft channel.

Figure 5:
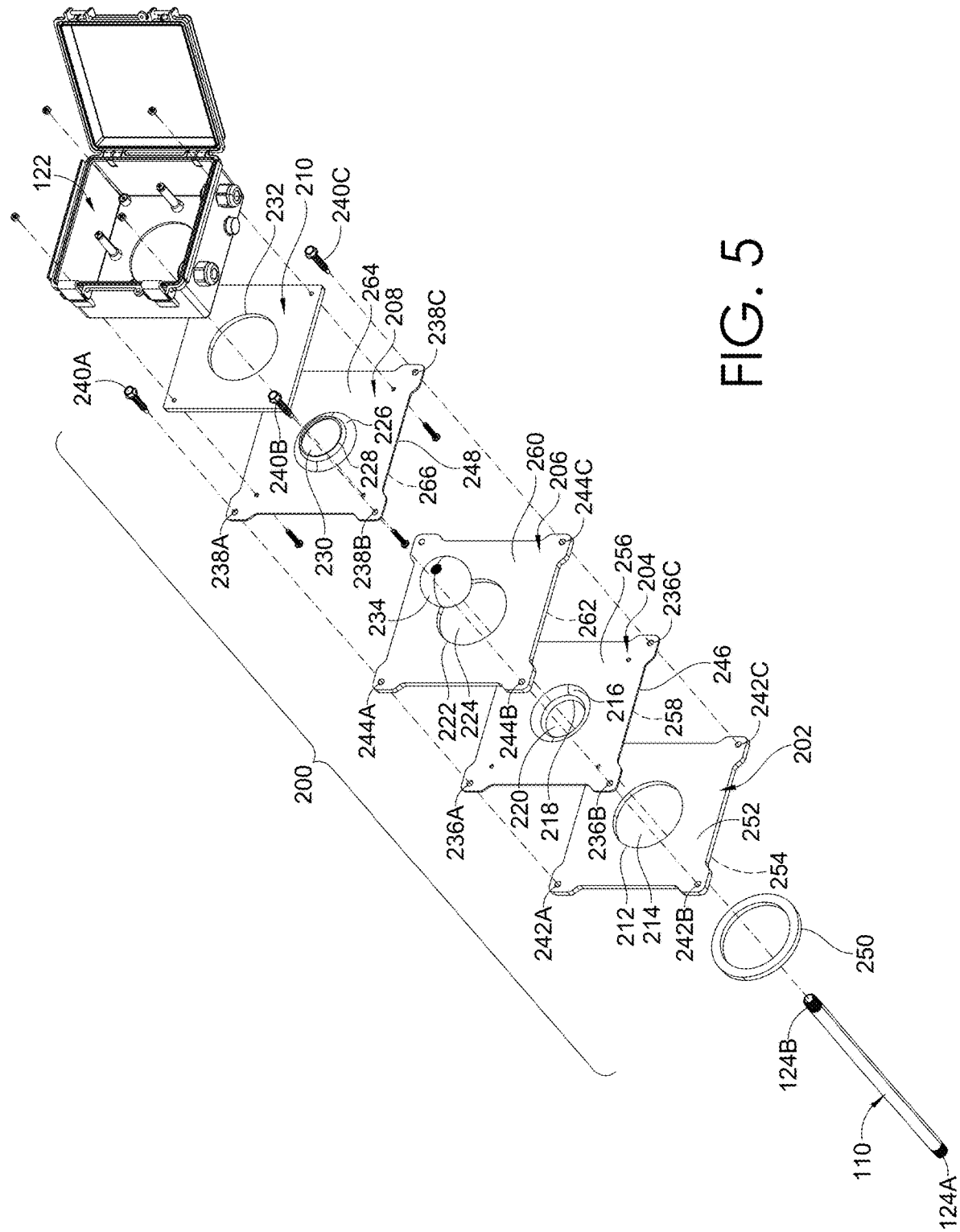
FIG. 5 is an exploded view of the locking system of FIG. 1B, in accordance with an aspect described herein.

Turning back to FIG. 5 and with reference to FIG. 1A, aspects of the technology include controller housing 122 coupled to locking system 200. Controller housing can comprise a controller configured to operate an image scanning system, or another device, used in conjunction with locking system 200. It should be understood that, while the example illustrated is suitable for positing a controller within controller housing 122, a controller may be positioned at any location, and may comprise one or more pieces of hardware. For instance, a controller can be comprised within components of an image scanning system 100, such as image scanning head 102, body housing 104, or securing arm 106. In aspects, the controller is a disparate and distinct component wirelessly communicating with components of image scanning system 100. Thus, while controller housing 122 is illustrated coupled to locking system 200, the illustrations of the present disclosure intend to provide an example that is suitable for practicing the technology, although any arrangement of features and components is still contemplated. In embodiments, controller housing 122 is coupled to locking system 200 with the aid of a housing flange 210. Controller housing 122 may comprise an opening through which wires for communication or power may pass through and into, for example, ball channel 272. While controller housing 122 is described as housing a controller, it will be understood that controller housing 122 can be more generally referred to as a "housing" that can comprise other components as well, such as communication components for communicating information through a wireless network.

To facilitate installation of locking system 200 and to lock locking system 200, a fastener can be placed through first securing plate 204 and second securing plate 208 and into a securing surface. To illustrate, first securing plate 204 comprises one or more first fastener holes 236A-236C. Similarly, second securing plate 208 comprises one or more second fastener holes 238A-238C. When locking system 200 is assembled by positioning first securing plate 204 between first compressible material 202 and second compressible material 206, and positioning second securing plate 208 adjacent to second compressible material 206, one or more first fastener holes 236A-236C are aligned with one or more second fastener holes 238A-238C such that a fastener, such as one or more fasteners 240A-240C, can be inserted through the fastener holes in the first direction. The fastener, such as one or more fasteners 240A-240C, may include a bolt, screw, nail, and the like.

In some cases, such as the one illustrated, first compressible material 202 comprises one or more third fastener holes 242A-242C, and second compressible material 206 comprises one or more fourth fastener holes 244A-244C. When locking system 200 is assembled as described, one or more third fastener holes 242A-242C align with one or more fourth fastener holes 244A-244C, such that a fastener, such as one or more fasteners 240A-240C, can be inserted through the fastener holes in the first direction.

Figure 6B:
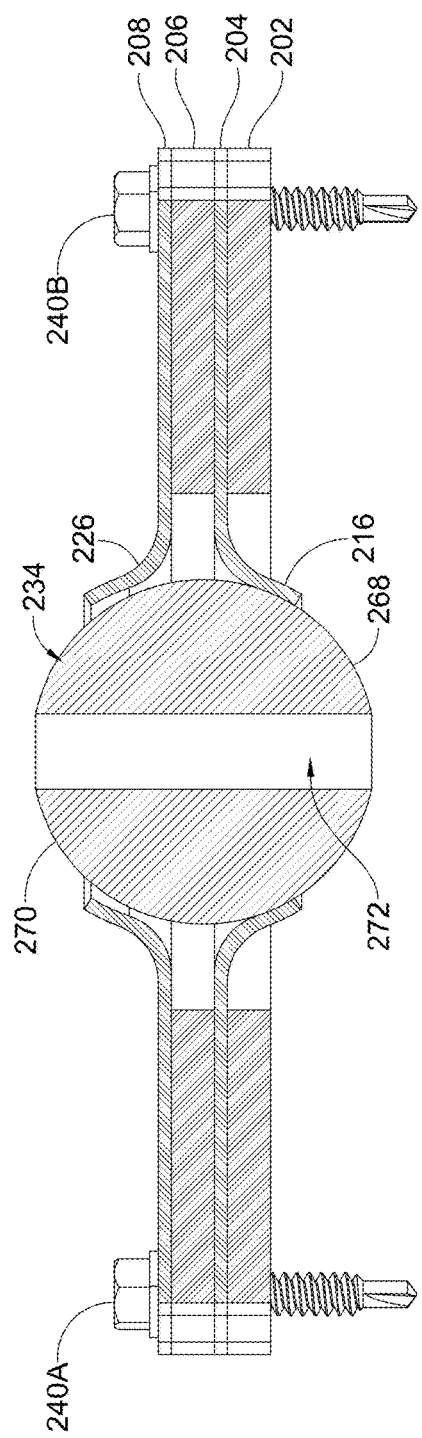
FIG. 6B is a cross-sectional side view of the locking system of FIG. 1B, in accordance with an aspect described herein.

FIGS. 6A-6B provide illustrations of locking system 200 after being assembled. Referring to these figures, fasteners 240A and 240B, and any other fasteners of locking system 200 can be engaged in a manner such that a distance between first securing plate 204 and second securing plate 208 is reduced. This causes first securing plate 204 and second securing plate 208 to exert a force on ball 234, which in turn, increases the force required to rotate ball 234 within the area between first curved edge 216 and second curved edge 226 where ball 234 is positioned, thus "locking" it into position. Said differently, a fastener, such as fastener 240A or 240B, can be engaged so that second compressible material 206 transitions from an expanded state to a compressed state to lock ball 234 into position. This can also occur when securing the fastener into a securing surface, such as the roof of a container, since the fastener is engaging first securing plate 204 and second securing plate 208 as it is being secured into the securing surface. In some cases, locking base flange 250 can be used to aid in securing the fastener to the securing surface. The fastener being secured into the securing surface further supports locking system 200 on the securing system such that it does not move about the securing surface.

Figure 7:
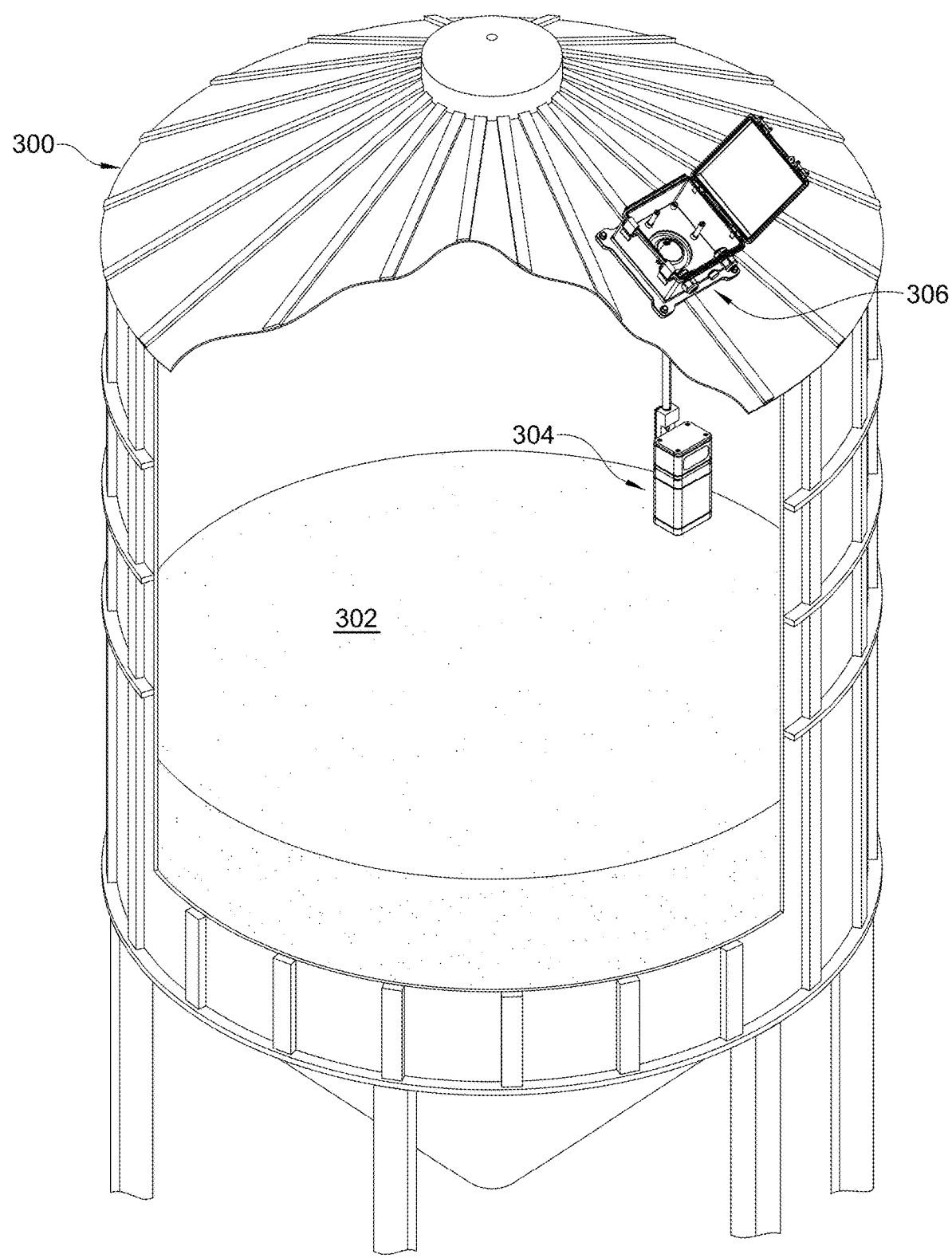
FIG. 7 is a an example image scanning system locked into position within a container using an example locking system, in accordance with an aspect described herein.

An example of this is illustrated in FIG. 7. FIG. 7 includes container 300 having within it product 302. For example, this may be a silo storing a farmed product. Image scanning system 304, which can correspond to any image scanning system described herein, is locked into place within container 300 using locking system 306, which can correspond to any locking system described herein.

Figure 8:
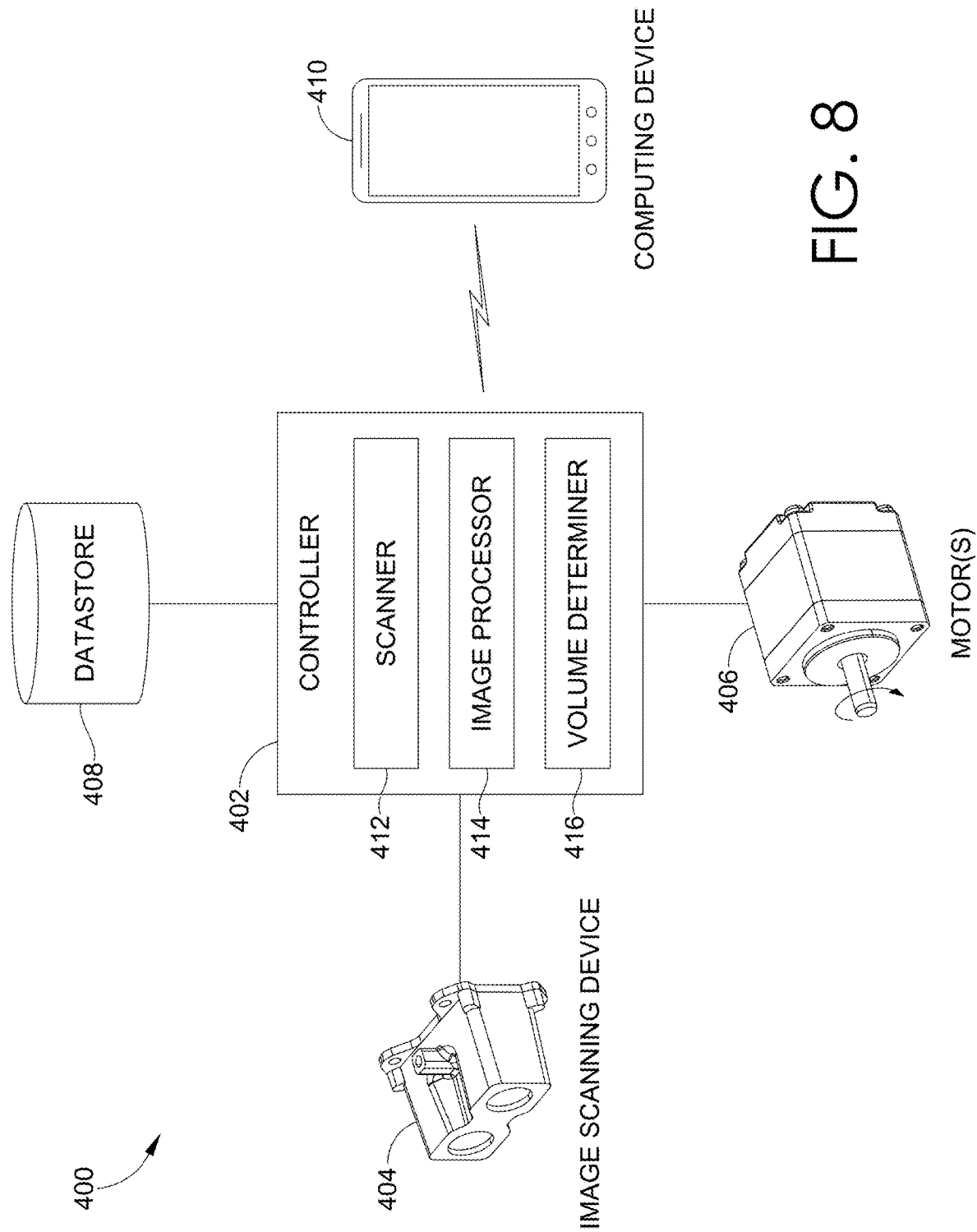
FIG. 8 is an example operating environment for a controller suitable for operating the image scanning system of FIG. 1A, in accordance with an aspect described herein.

FIG. 8 provides an example control system 400 suitable for operating image scanning system 100 of FIG. 1, or any other image scanning system described herein. Control system 400, as illustrated in FIG. 8, comprises controller 402 in communication with image scanning device 404 and motors 406. Image scanning device 404 and motors 406 are examples suitable for, and may generally correspond with, an image scanning device and motors described in any embodiment of this disclosure, such as image scanning system 100. Additionally, while illustrated as communicating with only image scanning device 404 and motors 406, it will be understood that controller 402 may be configured to operationally control other devices and components not shown.

As illustrated, controller 402 additionally communicates with datastore 408 and computing device 410. While controller 402 is illustrated as directly communicating with image scanning device 404, motors 406, and datastore 408, while wirelessly communicating with computing device 410, it will be understood that controller 402 can communicate with any of the components shown, and with components not shown, in any manner and combination, and that the communication illustrated by control system 400 is but one example.

In general, any components of FIG. 8 can communicate through direct wiring or wireless communication through a network. As an example, suitable wireless networks include one or more networks (e.g., public network or virtual private network "VPN") or one or more local area networks (LANs), wide area networks (WANs), or any other communication network or method.

Datastore 408 generally stores information including data, computer instructions (e.g., software program instructions, routines, or services), or models used in embodiments of the described technologies. Although depicted as a single database component, datastore 408 may be embodied as one or more datastores or may be in the cloud. Datastore 408, while illustrated as a standalone component, in other embodiments, may be integrated with another component, such as any component of control system 400, including computing device 410, or remotely accessed by any other component.

Computing device 410 may be any computing device, including a computing device having an interface component, such as an output component, for communicating information received from controller 402. An example computing device suitable for use includes computing device 1500 of FIG. 15.

It is emphasized that any additional or fewer components, in any arrangement, may be employed to achieve the desired functionality within the scope of the present disclosure. Although the various components of FIG. 8 are shown with lines for the sake of clarity, in reality, delineating various components is not so clear, and metaphorically, the lines may more accurately be grey or fuzzy. Although some components of FIG. 8 are depicted as single components, the depictions are intended as examples in nature and in number, and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Further, many of the elements described in relation to FIG. 8, such as those described in relation to controller 402 (e.g., scanner 412, image processor 414, volume determiner 416), are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as datastore 408.

Although many of the functional aspects are illustrated as being performed by controller 402, it will be realized that such functional components may be performed by any computing device, including computing device 410, and in any combination between controller 402, computing device 410, or another computing device. As such, the illustration is intended to be one example, rather than limit the disclosure to a particular implementation. For instance, controller 402 may be a distinct computing processor executing functions described herein. However, in other cases, controller 402 is included as part of remote computing device 410. While illustrated as a single controller, it will be understood that more than one "controller" can be employed, and may be located in various arrangements, including within, remote from, or both an image processing system, such as the image processing system 100 of FIG. 1.

Figure 15:
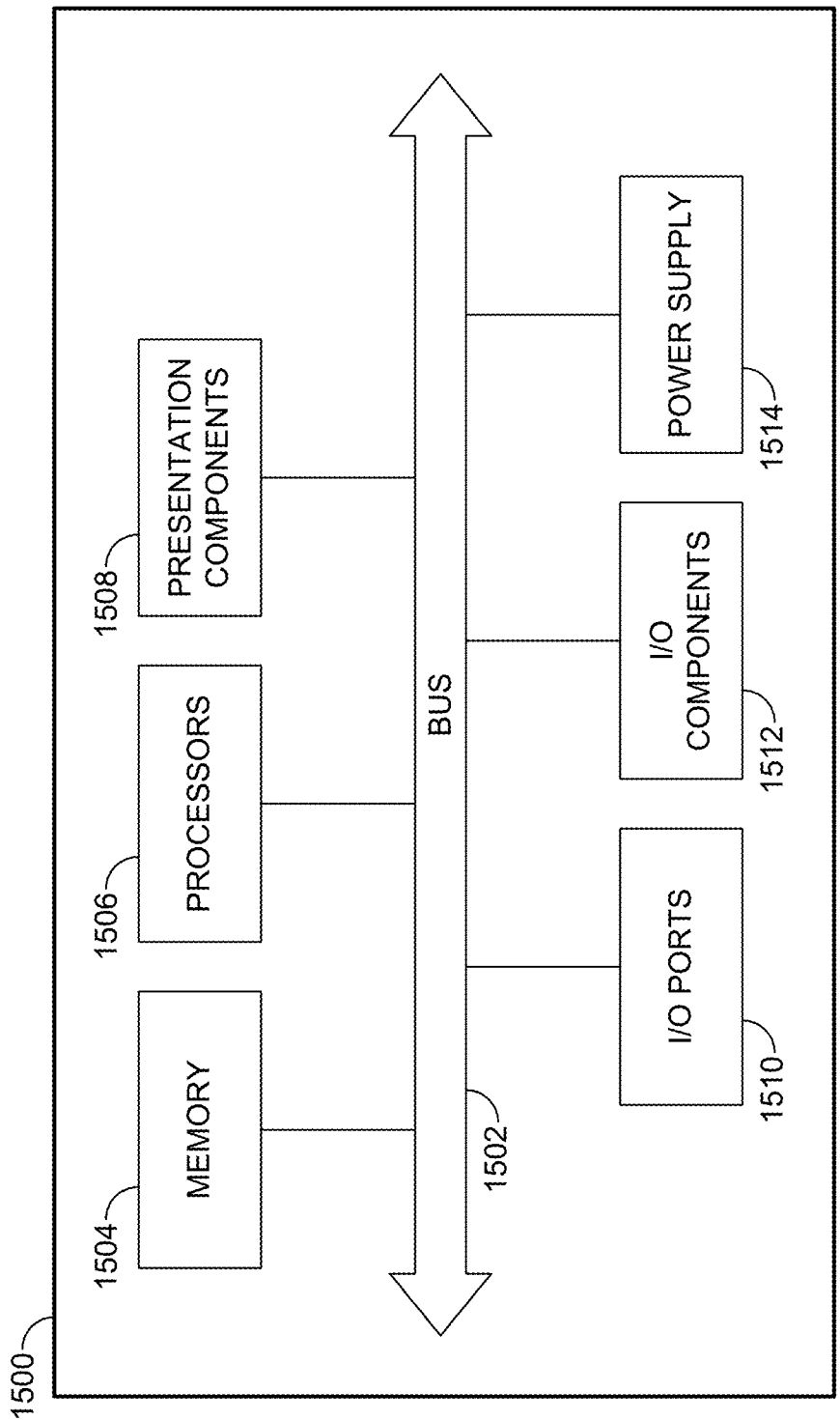
FIG. 15 is an example computing device suitable for implementing aspects of the described technology, in accordance with an aspect described herein.

Controller 402 can take the form of a control device, and at the most basic level, may be embodied as a computer processor. Computer processor 1506 of FIG. 15 is an example of a device suitable for use as controller 402. Controller 402 can be configured to execute functions stored in computer memory, such as datastore 408. Example functions are illustrated in FIG. 8 as scanner 412, image processor 414, and volume determiner 416. As illustrated, controller 402 is further configured to operationally control hardware devices of an image scanning system, such as image scanning device 404 and motor 406. Image scanning device 404 and motor 406 can be any of image scanning device or motor described herein, and can operate in any image scanning system described herein. Controller 402 may operationally control hardware devices, such as image scanning device 404 or motors 406 using drivers stored at datastore 408.

Controller 402 can employ scanner 412 to scan a container and a product within the container. In general, scanner 412 operates to instruct image scanning device 404 to initiate an image scan. During an image scan, image scanning device 404 emits a radiation wavelength, such as any wavelength along the electromagnetic spectrum, and in particular, any of those described herein. The radiation is emitted via an emitter comprised as part of image scanning device 404. In a specific instance, image scanning device 404 may operate as a LiDAR system, and emit a radiation wavelength at or between 600-1000 nm.

During emission, controller 402 operates to control motor 406. Motor 406 is intended to embody one or more motors configured to operate within an image scanning system, such as the image scanning system that includes image scanning device 404. The motor 406, under control of controller 402, positions image scanning device 404 via the image scanning system such that image scanning device 404 collects a plurality of distance points, e.g., distance values for locations of the container, to form a point cloud of distance information. That is, as image scanning device 404 is maneuvered into different positions, the radiation emissions emitted by the emitter reflect off different locations, or points, in the container, and the distance the points are from the detector is determined and recorded. This distance information can be stored in datastore 408. Using this method, a hemisphere of distance points associated with various angles of rotation of components of the image scanning system is collected.

FIG. 9A provides example point cloud, shown within scan 500, generated during a scan of container 300 and product 302 by image scanning device 304 of FIG. 7, which may comprise components that correspond to image scanning device 404 under control of scanner 412 of FIG. 8

With reference back to FIG. 8, image processor 414 can be employed to process the distance points of the point cloud, e.g., the "image." Several processing, or preprocessing techniques can be applied to the distance points by image processor 414. As will be understood, image processor can execute instructions stored on computer-storage media to perform functions that will be described in more detail herein. That it, the functions performable by image processor 414 may be in the form of computer-readable instructions stored on computer-storage media. As should be further understood the computer instructions can be configured such that any combination of the functions described herein, in any order, are performable by image processor 414.

To process the data points and provide volume and typographical information, image processor 414, in conjunction with volume determiner 416, may perform a series of steps that include building a distance information dataset, calibrate positioning, determine volume, and generate a topography map.

To build the distance information dataset, image processor 414 can calculate spherical or Cartesian coordinates for distance points of the distance information dataset, format distance points into a traversal graph, and further process that collected distance points.

In general, data comes in from image scanning device 404 as collection of points in a spherical coordinates system. Any image scanning device described in this disclosure may be used. When received, the distance points may be defined as r (radius), θ (theta), and φ (phi). Here, r is the distance measure by image scanning device 404, θ is angle of the image scanning device 404 during the scan, and φ is a pivot angle of the face of the image scanning head comprising image scanning device 404. In some cases, the initial collection of distance points may be in a non-standard spherical coordinate system, such as one having values from 0-180 and 0-360. Here, the range of θ and φ might be off. If so, they can be converted to a different spherical coordinate system having a range of 0-180 for θ and a range of −90-90 for φ. To do this, the spherical coordinates for the distances points can first be converted to standard Cartesian coordinates. One example of doing so is provided as follows:

$x = -r \times \cos(\theta) \times \cos(\varphi)$ $y = r \times \sin(\varphi) \times \sin(\theta)$ $z = r \cos(\theta)$ The standard Cartesian coordinates of the distance points can then be converted to standard spherical coordinates. One example of doing so is provided as follows:

$$r = \sqrt{x^2 + y^2 + z^2}$$

$$\theta = a\cos\left(\frac{z}{r}\right)$$

$$\varphi = \operatorname{atan}^2(y, z)$$

Standard spherical coordinates can be converted to standard Cartesian coordinates using the following:

$$x = r \times \sin(\theta) \times \cos(\varphi)$$

$$y = r \times \sin(\theta) \times \sin(\varphi)$$

$$z = r \cos(\theta)$$

The data can then be formatted into a traversal graph. In order to more efficiently traverse the point cloud, we construct a m×n array where m is the range of θ values and n is the range of φ values. It can be assumed that for any point (mi, ni), the point's neighbors may comprise:

(mi,ni+1)

(mi,ni−1)

((mi+1)% m,ni)

((mi−1)% m,ni)

In this case, (mi, ni) indicate the two-dimensional relative position of a distance point in the traversal graph. The traversal graph generally stores the index of the point in both the spherical or Cartesian point arrays, allowing for easy cross-referencing and updating, as will be described.

Next, image processor 414 can process the collected data. This can be done by adjusting for outliers, extrapolating data, and adjusting for image scanning device 404 offset.

For instance, once the distance information has been determined by scanner 412, image processor 414 can remove outlier distance points. As noted, the distance points can be represented as distance values to a particular location of the container or product in the container. Image processor 414 can identify duplicate distance points. These values can occur where there is more than one distance point for the same location of the container. Such duplicate distance points are identified and removed from the point cloud by image processor 414. In some cases, outliers are identified and overwritten with a median value determined from neighbor distance points.

Image processor 414 can remove outlier distance points based on the likelihood the distance point is a representation of a true reflection of the container or product. For instance, the distance values of the distance points may represent a Gaussian distribution. Those distance points that are greater than a predetermined distance from the mean may be removed by image processor 414. In one example, those distance points having values three or more standard deviations away from the mean are removed by image processor 414.

Image processor 414 can remove additional outlier distance points of the point cloud using Delaunay triangulation. This method helps discount neighbors that are not within a statistically significant range so that unassociated points are not grouped together.

If there are missing distance points, these distance points can be extrapolated. The missing distance points can be identified from the traversal graph. To determine an extrapolated distance point to provide as the missing distance point, an average value can be determined from neighbor distance point values for the neighbors of the missing distance point.

In many cases, an image scanning system is not positioned at a central location of the container, but is offset from the center by a particular distance. In cases where the image scanning system is not at the central location, image processor 414 can adjust the point cloud as a simple way to correct this offset.

Moreover, due to the rotation in the first and second directions, image scanning device 414 is generally not stationary at a single point during a scan. For instance, the emission and detection by image scanning device 414 is different at different points of rotation, such as if a body housing of the image scanning device is positioned perpendicular to a securing arm versus positioned parallel to the securing arm. Therefore, the origin of the point cloud moves depending on the angle of base housing. To account for this, each point can be translated by the distance from the base to the emitter for a given angle of the base housing, or other rotational component, which position and angle are known due to the user of stepper motors, or other positional determination method. The raw distance information comprising the distance points can be adjusted based using the known emitter distance from the point of rotation. After adjusting the distance information, some of the distance points may be found to overlap in location. The overlapping points can be removed. Missing distance points can be extrapolated, as described above, and added to the distance information.

Image processor 414 can also be used to calibrate for the position of the image scanning device relative to the container. For instance, image scanning device may not be positioned a central position relative to the walls of the container, sometimes referred to as the eaves of the container. This offset distance can be measured at the container. For instance, the distance value of the eave to the center of the container and the distance value of the image scanning device to the center of the container, can be measured and used to adjust for the point cloud. This is particularly helpful when determining a topography of the product. To adjust for the location of the image scanning device not being at a central location of the structure, the point cloud is moved so that a location where the roof meets the eave is at the 0 of the vertical axis (y). If there is a skew in the points, rotate the point cloud to be parallel to the vertical axis (y).

Figure 9B:
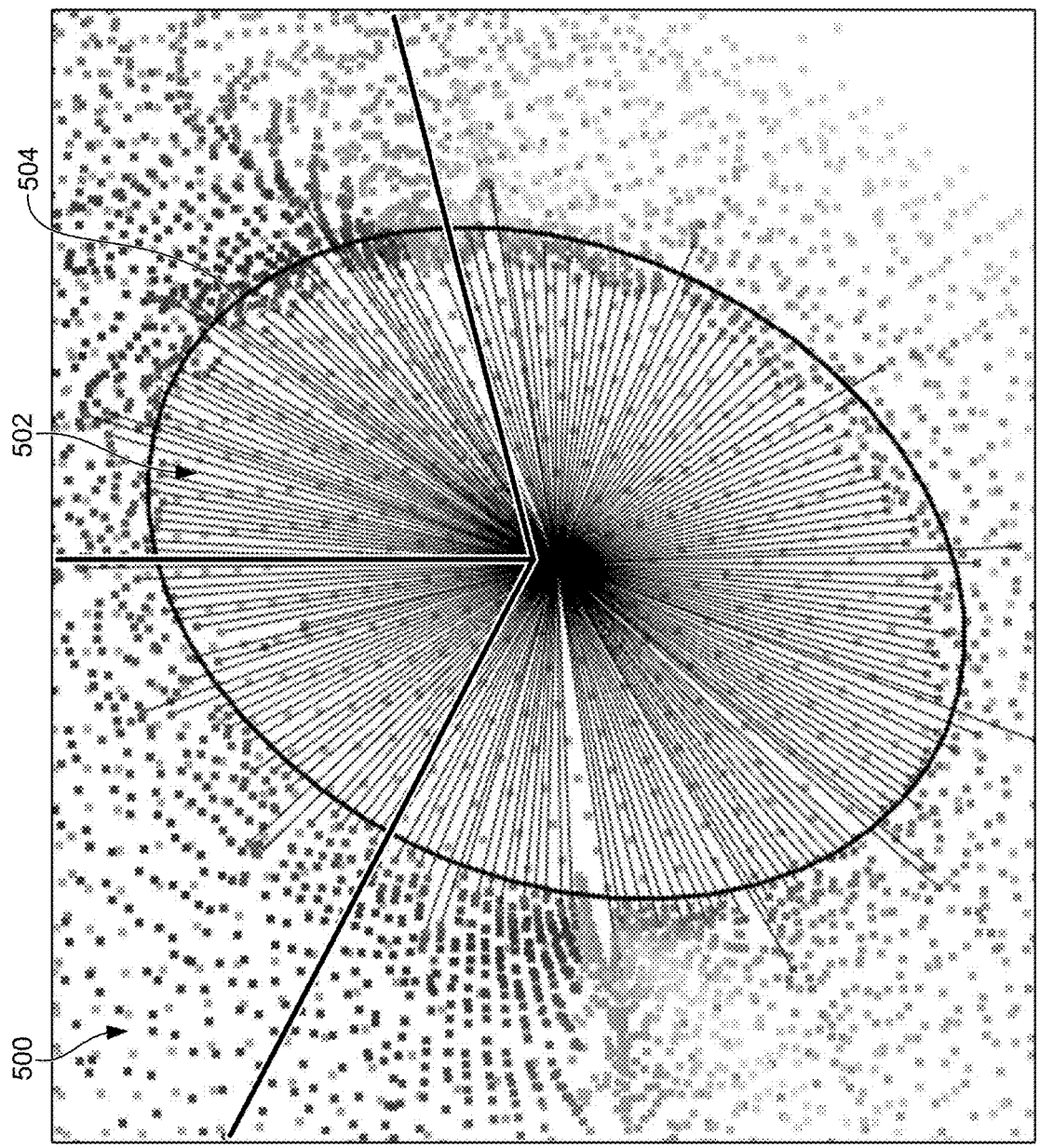
FIG. 9B is an enhanced view of a portion of the point cloud from FIG. 9A, in accordance with an aspect described herein.

To aid in adjusting the point cloud, image processor 414 calibrates the position of the image scanning system comprising image scanning device 404. For instance, an image scanning device may produce scan 500 shown in FIG. 9A. In some cases, scan 500 represents a scan after proceeding through the processing steps previously described. As will be understood, in some implementations, the scan may include area 502 directly above the image scanning system. Area 502 in this example includes an area, in this case a hemisphere, where images scanning device 404 was unable to measure distance points. Distance points can be retrieved that are located along an edge of the hemisphere of the scan. These points may include ni=0 and ni=n−1. An ellipse of best fit can be estimate using the Levenberg-Marquardt algorithm, identified generally as function 504, illustrated in FIG. 9B, which provides an enhanced view of a portion of FIG. 9A. Generally, by determining function 504, such as an ellipse, to represent the edge of area 502, the center point of area 502 can be approximated. This center point comprises a location at which the image scanning system is secured to a container roof. As will be described, function 504 and the location can be used to determine distance values identifying the location of the image scanning system relative to the container. Function 504 in FIG. 9B illustrates the function determined for area 502 of FIG. 9A.

In some cases, it may be beneficial to adjust for tilt of the image scanning system comprising image scanning. Tilt may occur where the image scanning system is not perfectly perpendicular to level ground. During installation, the tilt is eliminated or reduced using some locking systems provided herein. However, if an installation results in or requires some tilt, then this can be determined and adjusted for in the data reprocessing. In general, an assumption can be made that there is zero tilt.

If needed, to adjust for tilt of image scanning device 404, the tilt can be stored as an array of two angles [$\alpha$ (alpha), $\beta$ (beta)]. Here, $\alpha$ is the rotation of the ellipse, and $\beta$ is the vertical angle between the horizontal plane and the ellipse (determined previously as function 504 for area 502) using conic sections, which can be determined using the equation below:

$$\beta = \frac{\pi}{2} - a\tan\left(\sqrt{\frac{1-b^2}{a^2}}\right)$$

In this equation, a is the length of the semi-major axis of the ellipse, and b is the length of the semi-minor axis of the ellipse previously determined. These values will be used to determine distance values for the image scanning system and the container, and may be used to adjust the point cloud when isolating the product topography.

Figure 9C:
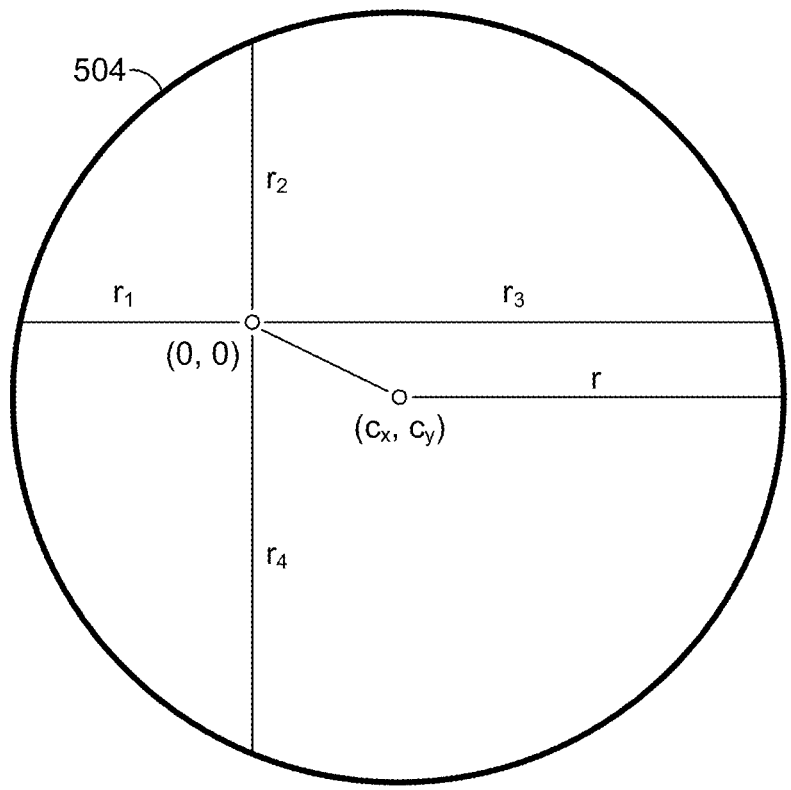
FIGS. 9C-D illustrate example geometric relationships to aid in determining distance values for the position of an image scanning system, such as the image scanning system of FIG. 1A, on a container for use in adjusting distance information determined by the image scanning system, in accordance with aspects described herein.

In some cases, distance values for the container, such as distance from the eaves to the center of the container, and distance values for the location of the image scanning device relative to the container, can be determined using the previously identified values. With reference to FIG. 9C, the figure illustrates ellipse 504 of FIG. 9B. Image scanning system has been placed at location (0, 0), which is not at a center ($c_x$, $c_y$) of the ellipse, i.e., function 504.

To determine the distance values for adjusting the point cloud, the ellipse can be divided into the four lengths $r_{1-4}$ that intersect at location (0,0) of the image scanning device. Further, r represents the radius of the ellipse, which in this case is circular in this particular case. Using these representative lengths, center ($c_x$, $c_y$), can be represented as follows:

$$(c_x, c_y) = \left(\frac{r_1+r_3}{2}, \frac{r_2+r_4}{2}\right)$$

Assuming that area 502 is circular, the center ($c_x$, $c_y$), determined above, can be used to find the radius of function 504 at the image scanning device using the equation below and sample points, which can include a distance point from the scan, such as a distance point along the edge of area 502 determined previously when calculating function 504.

$$r=\sqrt{(x-c_x)^2+(y-c_y)^2}$$

Figure 9D:
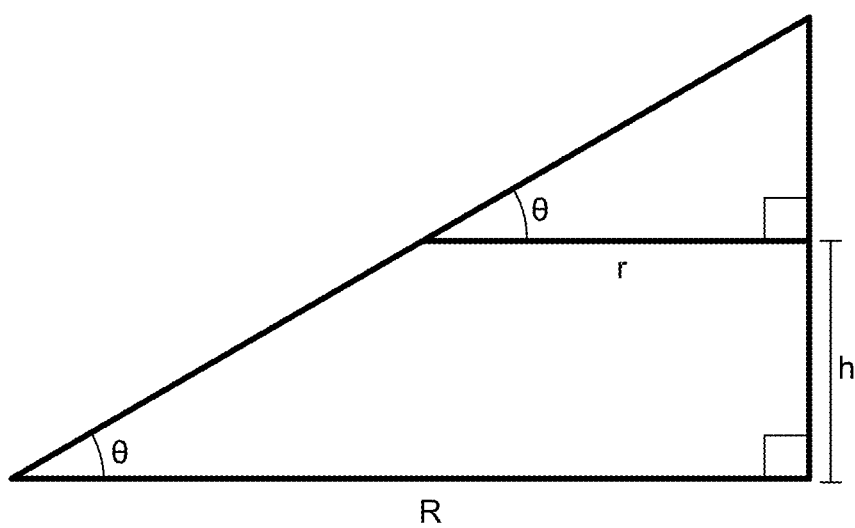
Figure 9E:
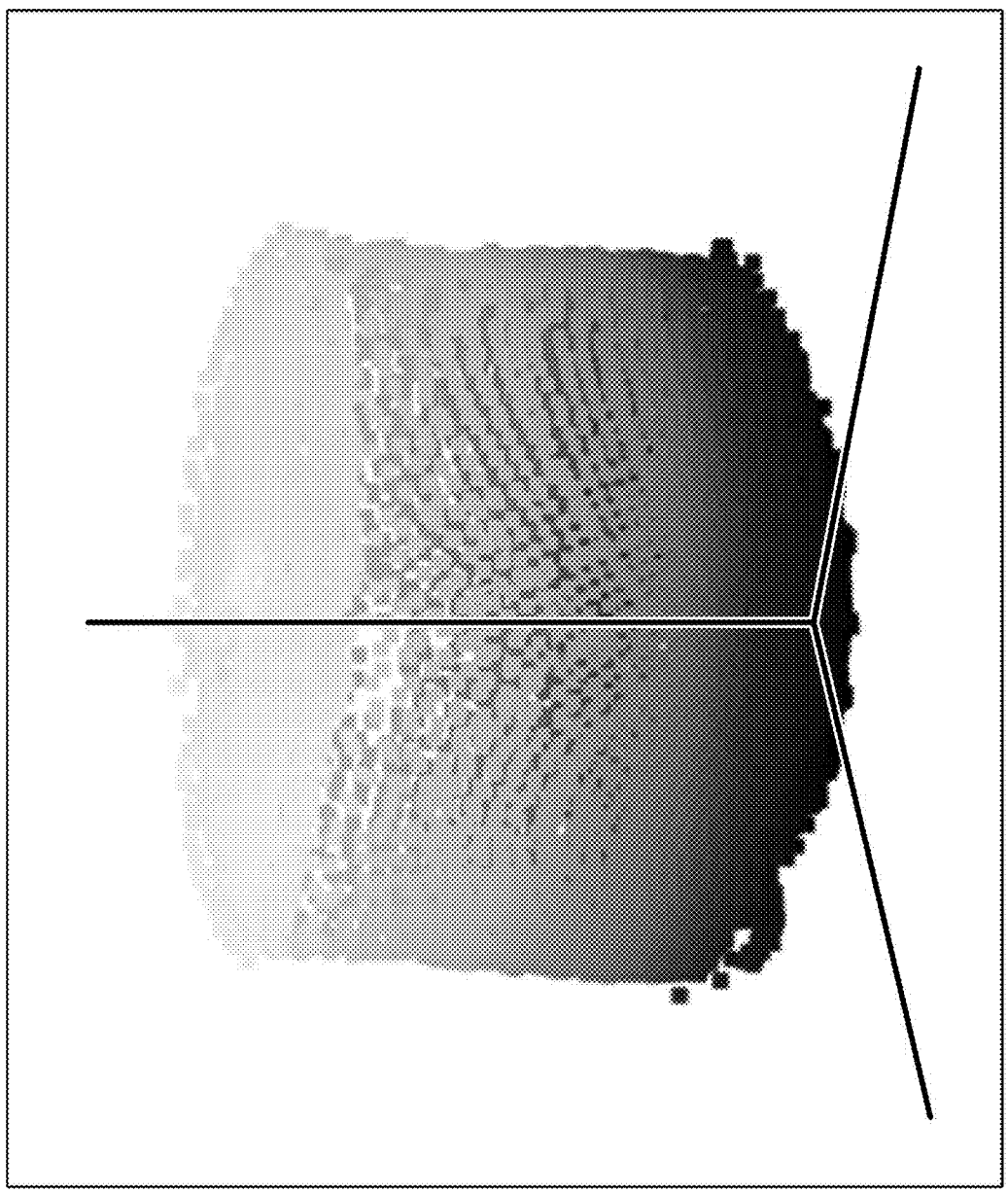
FIG. 9E is an example point cloud generated using the image scanning system of FIG. 1A, in accordance with an aspect described herein.

Finally, the geometric relationship between area 502 of FIGS. 9A-9C and the roof of the container can determined and the distance values calculated for each. Turning to FIG. 9D, the figure illustrates the geometric relationship. Here, R is the radius of the container, assuming a cylindrical container. As illustrated, this is geometrically related to r, which is the radius of function 504. For instance, represented as triangles, the distance from the center ($c_x$, $c_y$) to the eave is shown as h, which can now be determined using the equation below:

$$h=(R-r)\tan\theta$$

With h and ($c_1$, $c_2$) now known, the distance from eave and distance from center to be used in isolating the topography can be determined. The method may be enhanced by taking more than four samples, such as using the radii calculated when determining the tilt. This method is robust in that determining the direction of each radius is not needed when determining the center. As described previously, once the distance values for the image scanning system and the container are known, either through initial measurement or the example calculation method described, the Cartesian coordinates can be rotated and translated such that the origin is at the center of the eave and the tilt is zero.

Having determined the geometry of the container, image processor 414 can be used to further process distance points to classify distance points as associated with the container or the product, or are otherwise noise. In doing so, it is possible to generate a highly accurate topography of the product, along with a highly accurate volume or volume change of the product.

One example method of doing so includes performing a scan of a container having identical or substantially identical dimensions of the container. In another case, a scan of the container when empty can be performed. In either event, the scan may provide distance information in the form of distance points. Since the container is empty, the distance points can each identified as associated with the container, e.g., the roof, walls, floor, hopper, or the like. This provides an expected point of intersection for each distance point in a subsequent scan that is associated with the container, specifically whether distance point of the subsequent scan is associate with the wall, roof, hopper, floor, or the like. This information can be stored for reference when determining whether distance points of the subsequent scan are associated with the product, which aids in providing an accurate volume measurement and topographical mapping.

During a subsequent scan, of the container with product or a substantially similar container with product, distance points are collected. The collected distance points of the subsequent scan can be compared to the store distance points of the prior scan of the empty container or substantially similar empty container previously performed. If a distance points is significantly different from a distance point of the prior scan, then there is a probability that the distance point of the subsequent scan is associate with product, as opposed to a roof, wall, or so on. In another case, the distance point that is substantially different from the prior scan distance points is noise, as opposed to grain. However, another method that will be described can be used to differentiate between a distance point associated with product as opposed to a distance point associated with noise.

One method to determine whether a distance point of the subsequent scan is substantially different from the prior scan is use defined reference thresholds for one or more of the container parts. As an example, the following reference thresholds have been found suitable: roof: 20%; walls: 5%; hopper: 1%; floor 1%. Any other part of the container can have a reference threshold of 1%. That is, when a subsequent scan is completed, the distance points of the subsequent scan are compared to that of the prior scan. Where subsequent scan distance points have a distance that is equal to or greater than prior scan distance points by a factor greater than the reference threshold, the subsequent scan distance points can be identified as product or noise. Those subsequent scan distance points that have a distance less than prior scan points by a factor less than the reference threshold, then the subsequent scan distance points can be identified as associated with a part of the container, such as the roof, walls, and so forth. Those subsequent scan distance points, based on a distance to a prior scan distance point, can be classified as roof, walls, or so forth based on the classification of the prior scan distance points. In implementations, image processor 414 can remove one or more points associated that are classified as part of the container.

To further refine the dataset of distance points, distance points associated with noise can be removed. To identify distance points associated with noise, the subsequent scan distance points can be compared to the prior scan distance points. If a distance point of the subsequent scan is greater than distance points of the prior scan for the same classification, the greater subsequent scan distance point can be classified as noise and removed. In some cases, a reference threshold, such as 1%, can be applied to determine whether a subsequent scan distance point is greater than a prior scan distance point by a factor greater than the reference threshold. In general, this assumption may be made because it is assumed that the container defines the greatest distances, as the product is held within the container. Therefore, distance points associated with the product should have distances less than those distance points associated with the container.

Image processor 414 can further refine the dataset of distance points by references the previously generated traversal graph. To do so, image processor 414 can identify a seed distance point. The seed point can be identified from the dataset of distance points having removed distance points associated with the container and distance points associated with noise, such as using the methods previously described. Of this dataset, the seed point can be identified by identifying the distance point having the greatest measured distance from image scanning device 404. As will be understood, there is a high confidence that this point can accurately be classified as associated with product.

Once the seed is identified, the traversal graph can be referenced to determine distance points that are connected to the seed point, e.g., by determining whether a distance point is a neighbor distance point. This can continue for those distance points determined to be neighbors by determining the next neighboring distance points. This continues until all of the neighbors have been identified. Here, each of the identified neighbor distance points is connected to the seed distance point. In this way, terminal edges of the product are identified. Distance points of the dataset that are not connected with the seed distance point can be classified as noise and removed. Volume determiner 416 may be employed to estimate volume. This may include the product volume, e.g., the volume of the product in the container, or an empty volume, e.g., the volume of the area within the container not occupied by product. Two example methods for determining volume include determining the volume without removing distance points above the eave. Another determines the volume while removing points above the eave. Using one or both of these methods is beneficial because, in some container configurations, distance points associated with the container roof introduce error into the overall determination of the volume. As such, using both methods provides a way to compare the accuracy of the determined volume values.

For instance, volume determiner 416 can determine an empty volume of the container. The empty volume includes the volume of the container not occupied by the product. This can include the volume above the product in the container. One example method that can be employed by volume determiner 416 to calculate the empty volume is to determine a triangular mesh in the point cloud. Algorithms for determining a triangular mesh, such as a greedy surface triangulation algorithm are known in the art. Once the point cloud has been triangulated, a tetrahedron can be determined from the three distance points of each triangle to a point representative of the location of image scanning device 404, or another arbitrary point. Volume determiner 416 calculates the volume of each individual tetrahedron, each of which is summed to determine the empty volume. In this way, the empty volume can be calculated within in a manner that includes the volume of the container above the eave.

As noted, however, the empty volume may also be calculated based on removing the volume above the eave. In doing so, image processor 414 removes the roof and walls of the container from the point cloud. To remove the roof, all points below zero on the vertical axis, which here is representative of the roof are removed. To remove distance points defining the walls of the container, distance points that have a distance greater than or equal to a radius of the container, assuming the container is cylindrical, are removed. A margin of equal to or less than 10% error can be applied at this stage. Further, methods previously described for classifying distance points as part of the container can be employed, and those distance points for one or more of the container roof, walls, and so forth can be removed. Scan 506 illustrates a point cloud of distance points having removed distance points associated with the roof of the container, and is provided as an example illustration.

Continuing with reference back to FIG. 8, volume determiner 416 generally determines the volume of the product in the container, i.e., the product volume or the product occupied volume. To do so, volume determiner 416 may reference a total container volume stored in datastore 408. The total container volume may be predetermined and stored. One method for determining the total container volume is for controller 402 to initiate a scan of an empty container, e.g., a container without product. The empty volume can be determined as previously described. The empty volume determined when no product is present in the container is provided as the total container volume. Another example method uses geometric calculations that will be understood by those of ordinary skill in the art. For instance, for a cylindrical silo, the total container volume may be geometrically calculated using standard calculations for determining the volume of a cylinder. Volume determiner 416 may determine a product occupied volume by scanning a container having a product to determine an empty volume. The difference between the total container volume and the empty volume for a scan is one method of providing the product occupied volume of the container. In an example, the product volume is the difference of the empty volume and the total container volume. The output product volume can be communicated to computing device 410 for display at an interface. Volume determiner 416 can determine a product volume for subsequent scans by scanner 412. In this way, volume determiner 416 can determine the volume of product added to or distributed from the container.

Volume determiner 416 may also determine a change in product volume between subsequent scans. For instance, during a first scan, a first empty volume or a first product volume can be determined. During a second scan, a second empty volume or a second product volume can be determined. Volume determiner 416 may determine a change in the product volume using the difference between the first empty volume and the second empty volume, or the difference between the first product volume and the second product volume.

Figure 10:
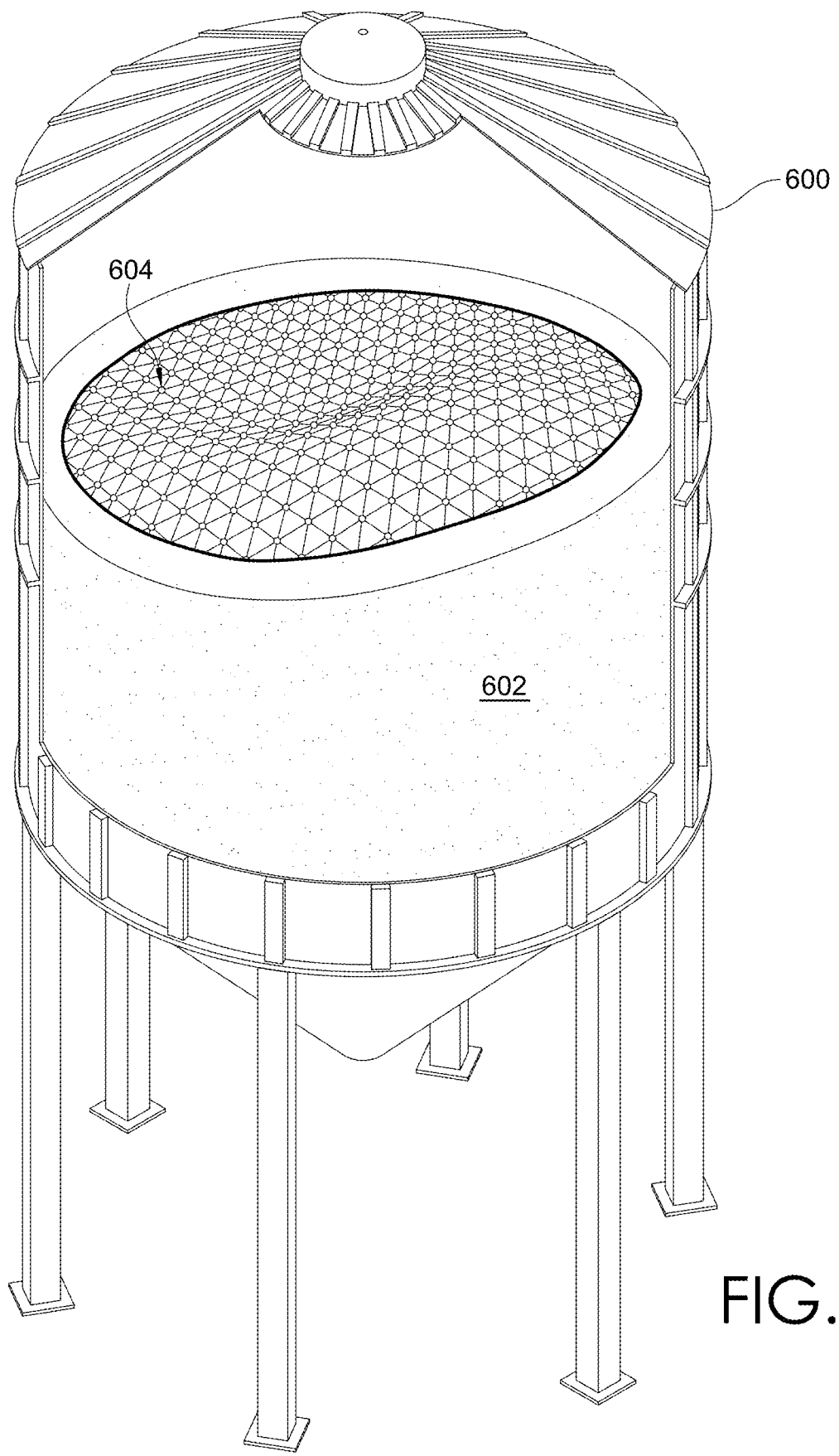
FIG. 10 is an example illustration of a one-dimensional typographical representation of product in a container, as generated using the image scanning system of FIG. 1A, in accordance with an aspect described herein.

As noted, image processor 414 may also generate a topography of the product in the container. Having performed one or more of the processing steps, image processor 414 transforms remaining three-dimensional coordinates of the distance points into a one-dimensional array of heights. This one-dimensional array of heights is representative of the topography of the product in the container. The topography of the product can be communicated to computing device 410 for display at an interface. An example of the one-dimensional product topography is illustrated as FIG. 10. As illustrated, container 600 comprises product 602. Using the described methods, topography 604 is generated and displayed at an interface of a computing device. In the example illustrated by FIG. 10, the distance points within the topography have been triangulated, which can aid in other calculations, such as an empty volume, as well.

Figure 11:
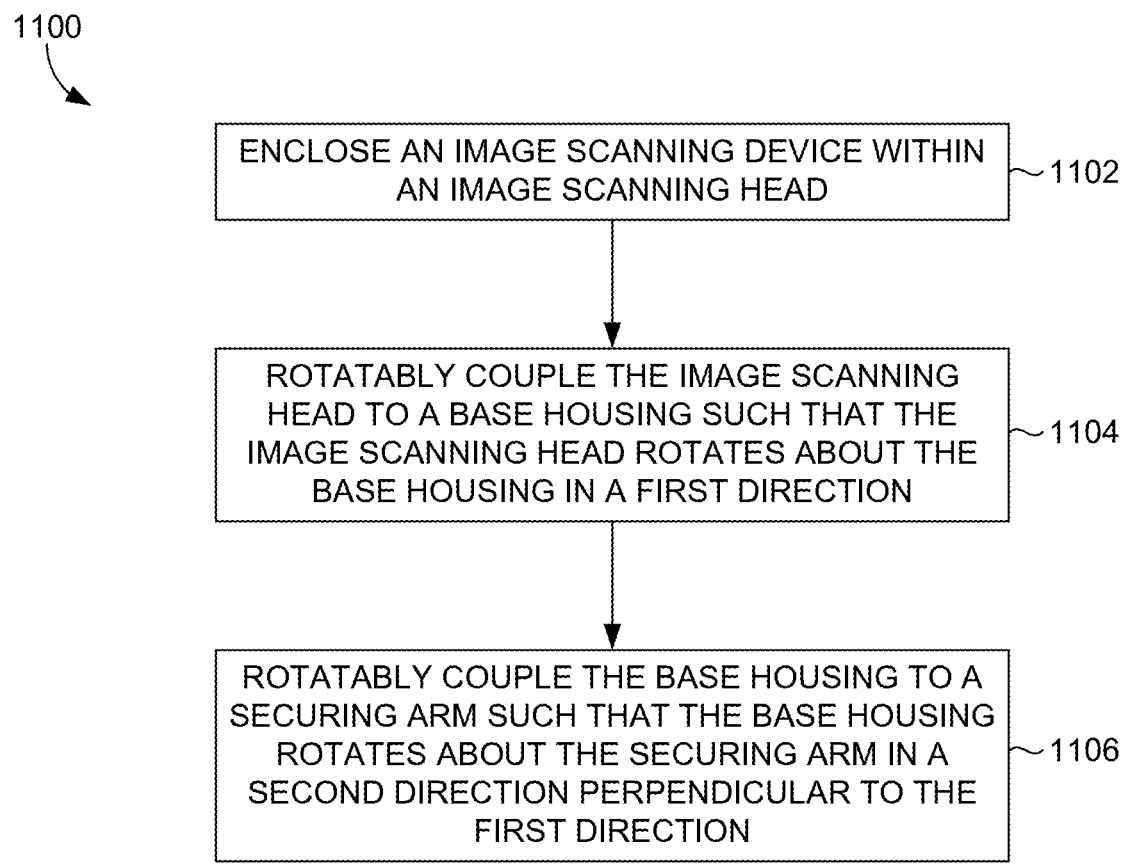
FIG. 11 is an example method for manufacturing an image scanning system, in accordance with an embodiment described herein.

FIG. 11 provides an example method 1100 for manufacturing an image scanning system. Method 1100 provides one example method of manufacturing those image scanning systems described herein, including image scanning system 100 of FIG. 1A.

At block 1102, an image scanning device is enclosed within an image scanning head of an image scanning system. The image scanning device may be any device for emitting or detecting a radiation wavelength. The image scanning device may further identify a time delay between emitted radiation and reflected detected radiation to determine a distance from the image scanning device to a location from which the radiation was reflected. A suitable image scanning device comprises a LiDAR system. However, it will be understood that other devices measuring distance using electromagnetic radiation may be suitable as well.

The image scanning device is enclosed within an image scanning head. The image scanning head may be constructed of a material, such as a hard polymer or metal. Methods of forming the image scanning head can include additive manufacturing methods, or other methods, such as milling. The image scanning head may be formed from a plurality of pieces and assembled using a fastener, such as a rivet, screw, and the like. The pieces may be affixed using methods such as gluing, welding, and the like.

The image scanning head can be manufactured with a window that is transparent to the radiation wavelength emitted or detected by the image scanning device. In one example, a face of the image scanning device is milled, cut, or otherwise formed to include an opening having a size corresponding to a window size of the window. The window can be inserted into the opening and affixed to the image scanning head by, for example, a glue, fastener and so forth.

A lens of the image scanning device can be aligned with the window. That is, the image scanning device is positioned such that radiation emitted at an emitter or received by a detector passes through the lens of the image scanning device and the window of the image scanning head. The image scanning device, once positioned, can be secured using fasteners such that the image scanning device is stable within the image scanning head during rotation of the components of the image scanning system.

At block 1104, the image scanning head is rotatably coupled to a base housing of the image scanning device. A rotary joint may be used to form the rotational coupling. A bi-directional, 360-degree rotary joint has been found suitable for use. The image scanning head is coupled such that the image scanning head rotates about the base housing in a first direction. In cases where bi-directional rotation is provided, the image scanning head may rotate forward and backward along the first direction (e.g., along a first plane of rotation). Wired connections from components of the image scanning head, such as power and communication, can be maintained through the rotary joint.

The method of manufacturing can further include configuring a first motor to rotate the image scanning head about the base housing. As described, the first motor can be brushless or brushed electric motor, for example. One suitable first motor is a stepper motor. The first motor can be secured in place within the base housing. A first motor shaft can be configured to rotate a portion of the rotary joint secured to the image scanning head, as has been described in a previous example, when the first motor is operational. The first motor can be communicatively coupled to a controller, which may be included within the base housing, or another component of the image scanning system, or external to the base housing in a controller housing.

At block 1106, the base housing is rotatably coupled to a securing arm of the image scanning system. The base housing may be formed of material, including a material described with reference to the image scanning head. Likewise, similar manufacturing methods, such as additive manufacturing, milling, construction from a plurality of individual components may be used to construct the base housing.

A rotary joint, such as the one described with reference to block 1104, can be used to form the rotational coupling such that the base housing rotates about the securing arm. The rotation of the base housing about the securing arm proceeds along a second direction. In cases where bi-directional rotation is provided, the base housing may rotate forward and backward in the second direction (e.g., along a second plane of rotation). The second direction is perpendicular to the first direction. In some cases, the second direction is about perpendicular the first direction. In this way, the rotation of the image scanning head about the base housing and the rotation of the base housing about the securing arm provides a mechanism by which a face of the window of the image scanning head can be positioned toward any direction. Moreover, the rotatory joint can provide for a wired connection, power or communication, of components within the base housing to components external to the base housing.

The method of manufacturing can further include configuring a second motor to rotate the base housing about the securing arm. As described, the second motor can be brushless or brushed electric motor, for example. One suitable second motor is a stepper motor. The second motor can be secured in place within the base housing. A second motor shaft can be configured to rotate a portion of the rotary joint secured to the securing arm, as has been described in a previous example, when the second motor is operational. The second motor, along with any other components, may be enclosed within the base housing.

In some aspects of the technology, the securing arm comprises a first securing arm end and a second securing arm end that is opposite the first securing arm end. The base housing can be rotatably coupled to the first securing arm end. The base housing can be coupled to the securing arm such that, at a point during rotation, the base housing and the image scanning head perpendicularly align with the securing arm. As will be understood, as with other arrangements, this manufactured arrangement is one example.

A shaft can be further coupled to the securing arm. In an aspect, the shaft has a first shaft end and a second shaft end, opposite the first shaft end. The first shaft end can be coupled to the first securing arm end and extend therefrom. In some cases, the shaft is integrally formed with the securing arm. That is, there may be no delineation between a shaft and the securing arm, but rather, these may include terminology for representing locations on an object.

In some implementations, the shaft is hollow, thus allowing wires, such as those transmitting communication and power, to be threaded through a shaft channel of the shaft. A pipe can be used as the shaft. Any rigid shaft, such as a pipe formed from polyvinyl chloride (PVC), steel, aluminum, and the like, may be used. Some suitable shafts range in diameter from about ⅛ inch to ¾ inch. In a particular case, a shaft can range in diameter from ⅛ inch to ¾ inch.

One suitable example method of coupling a shaft to the securing arm includes threading the first shaft end and threading a location of the second securing arm end, such that the threaded securing arm is configured to receive the threaded shaft. The shaft can be screwed at the threadings into the securing arm. In some configurations, the shaft channel can align with a securing arm channel. A wire for communication or power can be inserted though the shaft channel into the securing arm channel and connect with the rotary joint coupling the base housing to the securing arm such that communication and power can be provided to components housed within the base housing and the image scanning head.

A brush can be positioned on the image scanning system. In some manufacturing methods, the brush is coupled to a portion of the image scanning system such that the brush is within a plane of rotation formed by rotation of the base housing about the securing arm. The brush can be positioned such that, at a point during the rotation, the window contacts and moves across the brush. In an example, the brush is coupled to the securing arm at the second securing arm end. The brush can be positioned at a same side of the securing arm as the rotary joint facilitating rotation of the base housing about the securing arm. The brush may be made from any natural or synthetic material. The brush may be sized such that the brush extends along the securing arm over a distance that is equal to or greater than a height of the window, as measured when the base housing is in a position parallel to the position of the securing arm.

Figure 12:
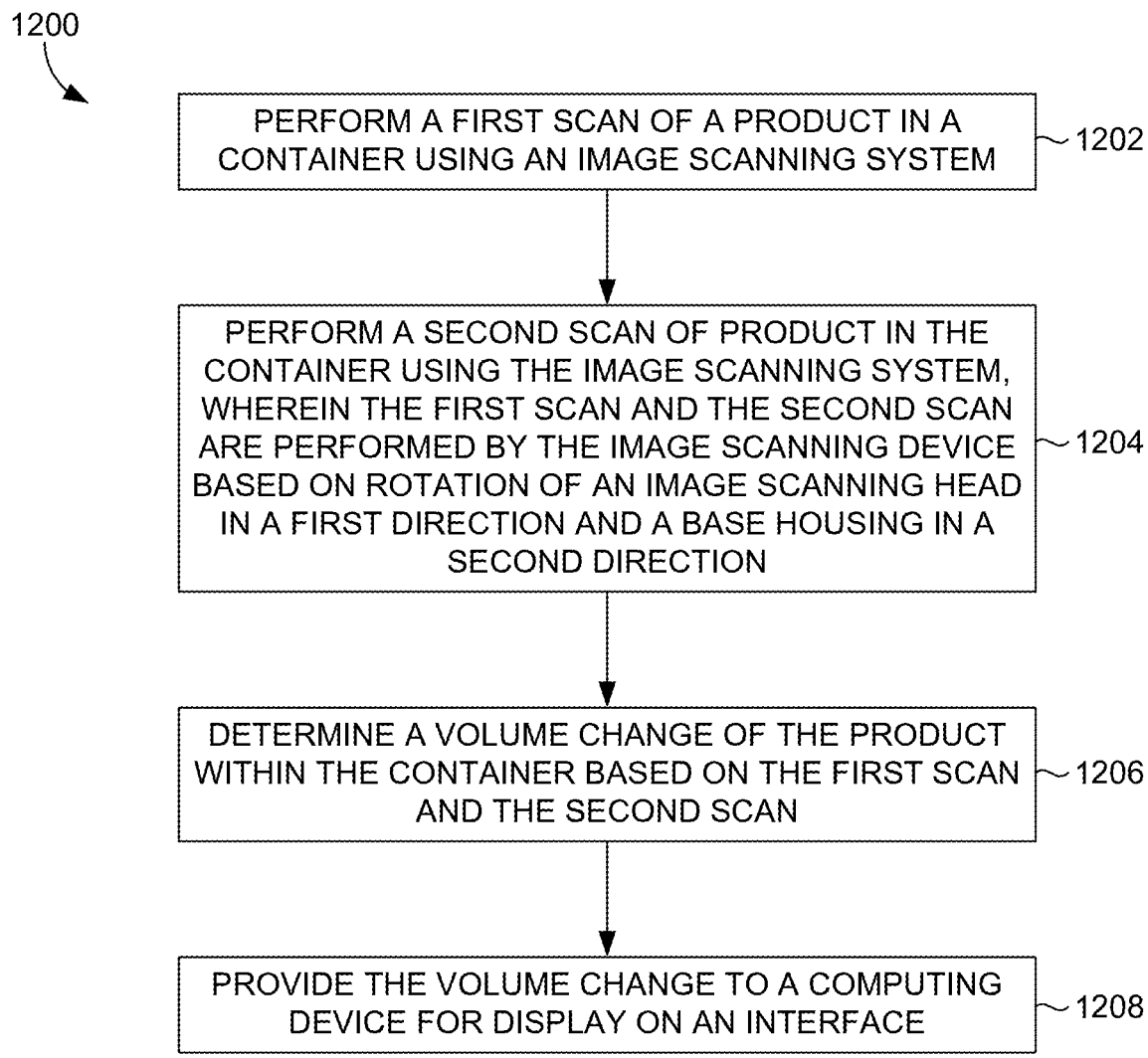
FIG. 12 is an example method for providing a product volume change using an image scanning system, in accordance with an aspect described herein.

Turning to FIG. 12, an example method 1200 of measuring a product in a container is provided. Method 1200 may be performed using any of the image scanning systems described herein. Aspects of method 1200 may be performed by control system 400 of FIG. 8. In embodiments, one or more computer storage media having computer-executable instructions embodied thereon that, when executed, by one or more processors, cause the one or more processors to perform operations of method 1200. Method 1200 may also be performed as a computer-implemented method by a computing device.

At block 1202 of method 1200, a first scan of a product in a container is performed. The scan can be performed by an image scanning device under control of a controller. For instance, image scanning device 404 of FIG. 8 can operate under control of controller 402 employing scanner 412. When performing the scan, distance information may be collected for distance points within the container, including distance points associated with the product in the container. The distance points may comprise distance values that indicate a distance from an image scanning device of the image scanning system to locations within the container corresponding to the distance points.

Distance information received from the first scan can be processed using any of the processing techniques described herein. For instance, image processor 414 can be utilized to process the distance information. At this point, a product volume may be determined. This can be performed, for instance, by volume determiner 416 of FIG. 8. The product volume may be provided for display at a user interface.

At block 1204, a second scan of the product can be performed. Similar to block 1202, image scanning device 404 of FIG. 8 can operate under control of controller 402 of FIG. 8 employing scanner 412 to perform the second scan. Similarly, distance information may be collected for distance points within the container, including distance points associated with the product in the container, as determined by the second scan.

Distance information received from the second scan can be processed using any of the processing techniques described herein. For instance, image processor 414 can be can be utilized to process the distance information. At this point, a product volume may be determined. This can be performed, for instance, by volume determiner 416 of FIG. 8. The product volume may be provided for display at a user interface.

As examples, image processor 414 may identify distance points, as determined during the first scan or the second scan, that are positioned above an image scanning system position. The identified distance points that are above the image scanning system position are removed. In some cases, this is performed prior to determining the volume change at block 1206.

In another example, image processor 414 may identify a point cloud during the first scan and the second scan. The distance points that have a distance greater than or equal to a radius, or other distance metric, of the container can be removed. This step can be performed for the point cloud determined for the first scan or the second scan. In some cases, this is performed prior to determining the volume change at block 1206.

At block 1206, a product volume change is determined. The product volume change can be determined by volume determiner 416 of FIG. 8. The product volume change can be determined based on the first scan and the second scan. That is, the difference between the product volume of the first scan and the product volume of the second scan can provide the change in the product volume. In another example, the empty volume is determined for the first scan and the empty volume is determined for the second scan. The change in the empty volume can be determined to provide the change in the product volume.

In some aspects, the product volume can be determined. The product volume may include the volume occupied by the product in the container. When the total container volume is known, the product volume can be determined using the empty volume and total container volume. In some cases, the product volume for any scan can be determined and provided to a computing device for display on a user interface.

The product volume may change due to adding or distributing product between scans. Other factors, such as drying, may cause the product volume to change. Said differently, the first scan and the second scan collect distance information of the product relative to the image scanning system, and the volume change is determined based on a change in the distance information of the product between the first scan and the second scan.

The change in product volume between the first scan and the second scan is provided to a computing device at block 1208 for display at an interface of the computing device.

Figure 13:
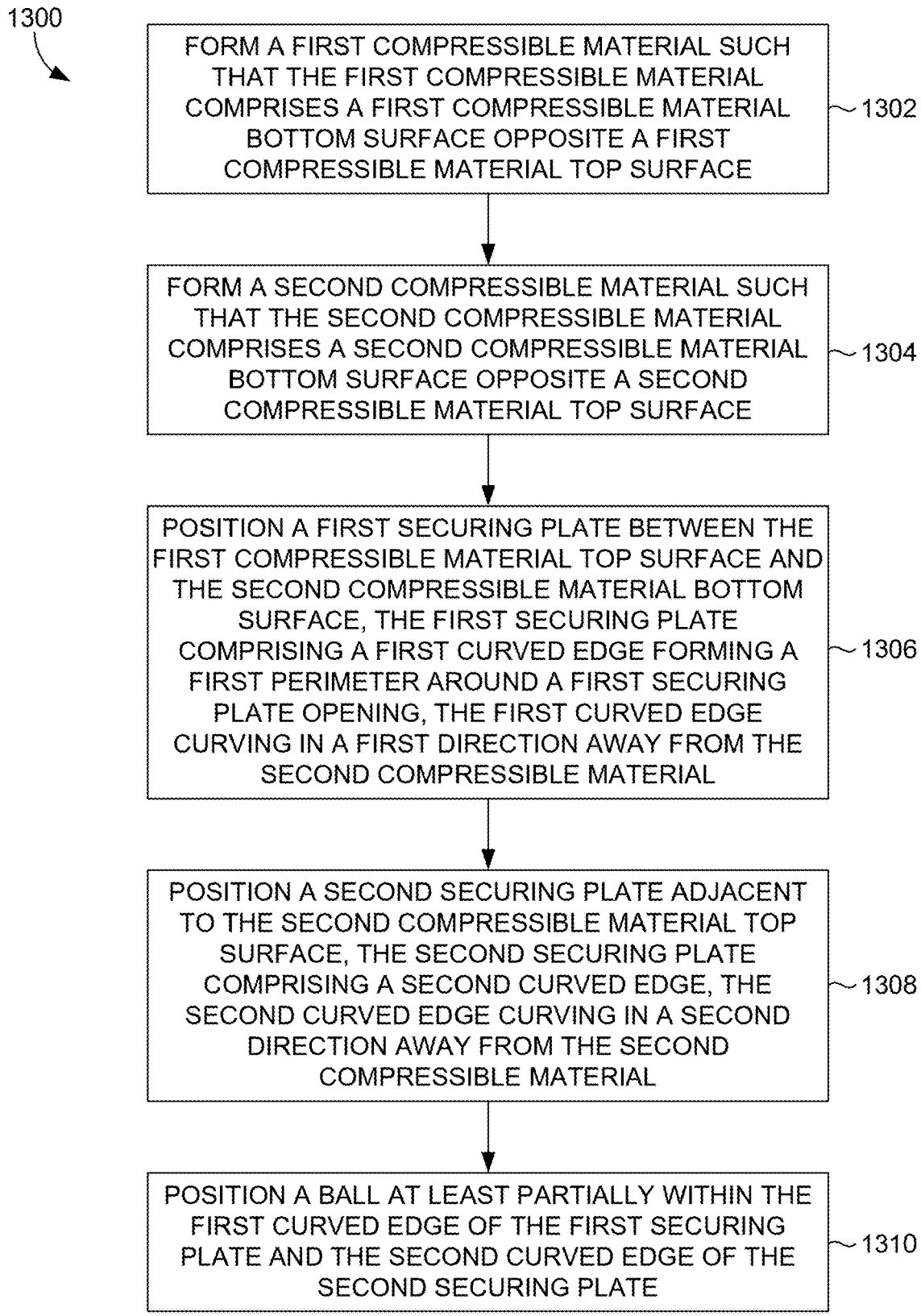
FIG. 13 is an example method of manufacturing a locking device, in accordance with an aspect described herein.

Turning to FIG. 13, an example method 1300 for manufacturing a locking system is provided. Method 1300 may be suitable for manufacturing any of the locking systems described herein, such as locking system 200 of FIG. 1B.

At block 1302, a first compressible material is formed. The first compressible material can be formed such that it includes a first compressible material top surface opposite a first compressible material bottom surface. The first compressible material can be made of any compressible material, such as a closed-cell or open-cell foam padding. Many synthetic materials are suitable for use as the first compressible material. Some specific examples include neoprene, ethylene-vinyl acetate (EVA), ethylene propylene diene monomer (EDPM), and so forth. Such synthetic foams have been found beneficial during use because of their ability to compress, while resisting degradation. The first compressible material can be formed by cutting the foam into a particular size. In an aspect, the first compressible material is about equal to or less than 12 inches. In a specific case, the first compressible material is formed such that it is equal to or less than 12 inches.

At block 1304, a second compressible material is formed. The second compressible material may comprise any of the materials described with respect to the first compressible material. To form the second compressible material, the second compressible material can be cut to a size corresponding to the size of the first compressible material. The second compressible material is formed such that the second compressible material comprises a second compressible material top surface opposite a second compressible material bottom surface.

At block 1306, a first securing plate is positioned between the first compressible material top surface and the second compressible material bottom surface. The first securing plate is disposed between the first compressible material and the second compressible material. The first securing plate may be sized to correspond to the first compressible material or the second compressible material. The first securing plate can be formed of a hard polymer, metal, or the like. Stainless steel, aluminum, and the like, or alloys thereof are suitable for use. The size of the first securing plate can be formed by cutting, welding, and so forth.

In some aspects, the first compressible material or the second compressible material is affixed to the first securing plate. The first compressible material or the second compressible material can be permanently affixed to the first securing plate. For instance, a glue or other bonding compound, or fastener, such as a tape, may be applied to affix the first compressible material or the second compressible material to the first securing plate.

At block 1308, a second securing plate is positioned adjacent to the second compressible material. In aspects, adjacent to the second compressible material includes adjacent to the second compressible material top side. Adjacent may include the second compressible material top surface being in contact with the second securing plate. Block 1308 can comprise forming the second securing plate to a size corresponding to the first securing plate. The second securing plate can comprise a material described with respect to the first securing plate.

In aspects, the first securing plate can be formed to include a curved edge that forms a first securing plate opening perimeter edge around a first securing plate opening. The first securing plate opening can be formed by methods described herein, including cutting, puncturing, and so on. The first securing plate opening may be located at a center position of the first securing plate. The first securing plate opening can include a first securing plate opening perimeter edge formed by the first curved edge of the first securing plate. In aspects, the first perimeter edge is located inward from a first securing plate perimeter edge. The first securing plate can be positioned such that the curved edge is curved in a first direction away from the second compressible material.

The second securing plate can also be formed to include a curved edge. The curved edge may form a second securing plate opening perimeter edge around a second securing plate opening. In some aspects, the second securing plate does not have a second securing plate opening, and the curved edge is included as part of an indentation in the second securing plate. The first securing plate opening can be formed using any method described herein, such as cutting, puncturing, and so on. In aspects where the second securing plate comprises a second curved edge that is part of an indentation, the indentation can be created by stamping the second securing plate with an object. In any event, the second securing plate opening or the second securing plate indentation can be located at a center position of the second securing plate. In aspects, the curved edge of the second securing plate is located inward from a second securing plate perimeter edge. In aspects, the second securing plate can be positioned such that the second securing plate opening or the second securing plate indentation is aligned with the first securing plate opening.

In one manufacturing method example, the first securing plate and the second securing plate are dimensionally the same. That is, two securing plates may be manufactured to the same specifications. Inverting one securing plate relative to the other securing plate provides the first securing plate and the second securing plate.

In a particular case, the second compressible material can be affixed to the second securing plate. The second compressible material can be permanently affixed to the securing plate. A glue or other bonding compound, or fastener, such as a tape, may be applied to affix the second compressible material to the second securing plate. In an aspect, the second compressible material is not affixed to the second securing plate.

The method of manufacturing may also include forming one or more first fastener holes within the first securing plate. One or more second fastener holes can be formed within the second securing plate. The one or more first fastener holes and the one or more second fastener holes can be formed on the first securing plate and the second securing plate, respectively, such that the one or more first fastener holes and the one or more second fastener holes align when the second securing plate is positioned atop the first securing plate when the locking system is assembled. The one or more fastener holes may be formed by any method described herein, including cutting, drilling, milling, and so forth.

At block 1310, a ball is positioned at least partially within the first curved edge and the second curved edge. The ball can be positioned such that a center of the ball is disposed between the first securing plate and the second securing plate. The ball may be formed of any hard material, including hard polymers, metal, or the like. The ball can be formed of a compressible material, such as a compressible polymer, rubber, or the like. A compressible ball can also be beneficial in that the ball compresses when the securing plates apply force to the ball. This more tightly holds the ball in place because it distorts its spherical shape, which provides enhanced locking, since the non-spherical shape is less likely to rotate within the curved edges of the securing plates due to the distortion. In aspects, the ball has a diameter about equal to or less than three inches. In particular cases, the ball has a diameter equal to or less than three inches.

A ball channel can be formed in the ball. The ball channel may extend from one side of the ball to an opposite side of the ball, extending through the center of the ball. The ball channel can be formed using any methods described herein, including drilling. The ball may be positioned such that one of the ball channel openings corresponds with the first securing plate opening. The ball channel may be formed using any of the methods described herein, including created through aggregate manufacturing methods, drilling, milling, and so forth.

The manufacturing methods may further include coupling a shaft to the ball. The shaft may have a first shaft end and a second shaft end. The first shaft end can be configured, for example by threading, to couple to the ball and extend outward therefrom. The shaft can have a shaft channel, e.g., a hollow shaft, and the shaft can be coupled to the ball so that the shaft channel corresponds with the ball channel such that the shaft channel fluidly extends into the ball channel. In some cases, a wire may be inserted into the ball channel and extend into the shaft channel. The wire may extend from a first ball channel opening at a first ball side through the ball channel and out of a second ball channel opening at the second ball side opposite the first ball side.

In aspects, a controller housing can be coupled directly or indirectly to the second securing plate. An opening within the controller housing can be formed at a location where the controller housing couples with the locking system, such that the ball channel of the locking system opens into the controller housing.

Figure 14:
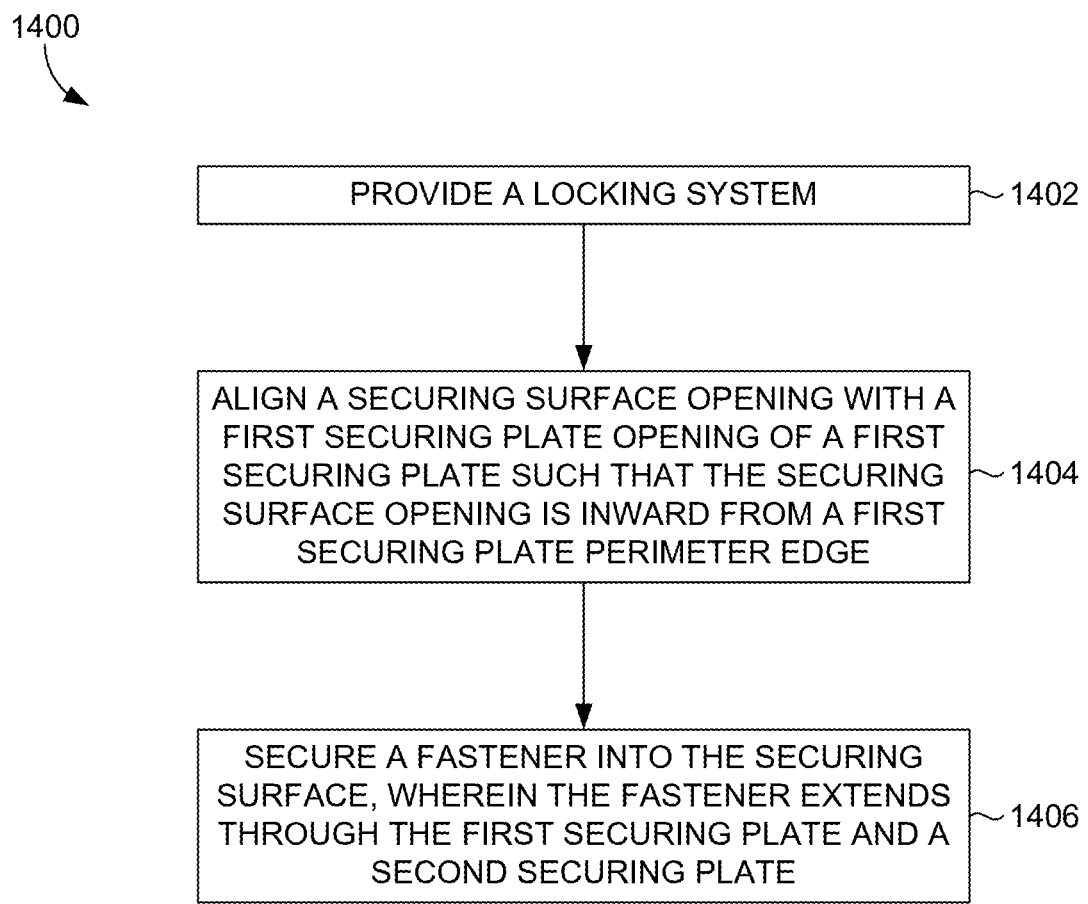
FIG. 14 is an example method of using a locking device, in accordance with an aspect described herein.

With reference now to FIG. 14, an example method 1400 of using a locking system is provided. At block 1402, a locking system is provided. The locking system can be any locking system described herein. For example, locking system 200 of FIG. 1B is suitable for use. Providing the locking system may include manufacturing, receiving, assembling, and so forth.

At block 1404, a first securing plate opening is aligned with a securing surface opening. The securing surface can include a surface of a container. The securing surface may be the roof of the container. Any method described herein can be used to form the securing surface opening, including cutting the opening from the securing surface. The securing surface opening can be formed to have a size (e.g., width, diameter) that is less than a size of a first securing plate. The locking system can be positioned such that the first securing surface opening is positioned inward from a first securing plate perimeter edge. In aspects, the first securing plate opening perimeter edge of the first securing plate opening, when the locking system is positioned, is located inward from a securing surface opening perimeter edge of the securing surface.

When positioning the locking system, a shaft can be inserted through the securing surface opening. The shaft may extend from the locking system positioned on a first side of the securing surface through the securing surface opening and into a second side of the securing surface. As will be understood, the shaft may support an image scanning system on the end opposite the locking system that is within the container on the second side of the securing surface.

At block 1406, one or more fasteners are secured into the securing surface. Using locking system 200 as an example, as illustrated by FIG. 6A and FIG. 6B, fasteners 240A and 240B can extend through second securing plate 208 and first securing plate 204. Fasteners 240A and 240B can be inserted through a second fastener hole of second securing plate, through a first fastener hole of first securing plate and secured into the securing surface. In the example shown, fasteners 240A and 240B also extend through second compressible material 206 and first compressible material 202. However, it should be understood that in some arrangements, the one or more fasteners do not extend through a first compressible material or a second compressible material.

When engaging the fasteners, first securing plate 204 and second securing plate 208 are moved to a distance that is relatively closer, compressing second compressible material 206. Put another way, second compressible material 206 is transitioned from an expanded state to a compressed state. This causes a force to be applied to ball 234, thereby increasing the force required to rotate ball 234, and in turn shaft 110.

The ball feature is beneficial in that it provides a way to secure the locking system at an angle relative to the shaft. This is helpful as many containers do not have flat roofs, but instead, the roofs are pitched to some degree. In this way, the locking system can be placed at an angle on the securing surface, and the ball rotates so that the shaft is perpendicular with a level ground surface. Thus, when the locking system is locked into place, an image scanning system, held in place by the shaft and the locking system, naturally moves to the correct orientation and stays in that orientation, even during movement of the image scanning system. Thus, based on the fastener being secured into the securing surface, the shaft is locked into a shaft position, where the shaft position forms an angle that is less than 90 degrees relative to the first securing plate.

In this way, the locking system is locked in place and secured to the securing surface. In those implementations of the locking system using a first compressible material, such as locking system 200, the first compressible material compresses against the securing surface forming a seal between the locking securing surface and the locking system, helping to prevent moisture and other elements from entering the securing surface opening.

Having described an overview of embodiments of the present technology, an example operating environment in which some embodiments of the present technology may be implemented is described below in order to provide a general context for various aspects.

Referring now to FIG. 15, in particular, an example operating environment for implementing embodiments of the present technology is shown and designated generally as computing device 1500. Computing device 1500 is but one example of a suitable computing environment and is not intended to suggest any limitation as to the scope of use or functionality of the technology. Neither should computing device 1500 be interpreted as having any dependency or requirement relating to any one or combination of components illustrated.

Some aspects of the technology of the present disclosure may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments whereby tasks are performed by remote-processing devices that are linked through a communications network.

With reference still to FIG. 15, computing device 1500 includes bus 1502 that directly or indirectly couples the following devices: memory 1504, one or more processors 1506, one or more presentation components 1508, input/output ports 1510, input/output components 1512, and illustrative power supply 1514. Bus 1502 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 15 merely illustrates an example computing device that can be used in connection with one or more embodiments of the present technology. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1504 includes computer storage media in the form of volatile or nonvolatile memory. The memory may be removable, non-removable, or a combination thereof. Example hardware devices include solid-state memory, hard drives, optical-disc drives, etc. Computing device 1500 includes one or more processors that read data from various entities such as memory 1504 or I/O components 1512. Presentation component(s) 1508 present data indications to a user or other device. Examples of presentation components include a display device, speaker, printing component, vibrating component, etc.

I/O ports 1510 allow computing device 1500 to be logically coupled to other devices including I/O components 1512, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless otherwise stated, the term "coupling," and the like, may be affixing, either directly or indirectly, two components. Coupled components may be removably secured or permanently affixed unless otherwise stated. Further, the term is not meant to imply a particular method of affixing components together.

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

Some example aspects of the technology that may be practiced from the forgoing disclosure include the following:

Aspect 1: A locking system comprising: a first compressible material having a first compressible material bottom surface opposite a first compressible material top surface; a second compressible material having a second compressible material bottom surface opposite a second compressible material top surface; a first securing plate disposed between the first compressible material top surface and the second compressible material bottom surface, the first securing plate comprising a first curved edge forming a first securing plate opening perimeter edge around a first securing plate opening, the first curved edge curving in a first direction away from the second compressible material; a second securing plate adjacent to the second compressible material top surface, the second securing plate comprising a second curved edge, the second curved edge curving in a second direction away from the second compressible material; and a ball positioned at least partially within the first curved edge of the first securing plate and the second curved edge of the second securing plate.

Aspect 2: Aspect 1, wherein the second curved edge forms a second securing plate opening perimeter edge around a second securing plate opening.

Aspect 3: Any of Aspects 1-2, further comprising a fastener extending through the first securing plate and the second securing plate.

Aspect 4: Aspect 3, wherein the fastener further extends through the first compressible material and the second compressible material.

Aspect 5: Any of Aspects 1-4, further comprising a shaft extending from the ball in the first direction.

Aspect 6: Aspect 5, wherein the ball comprises a ball channel and the shaft comprises a shaft channel, the ball channel extending from a first ball side opposite a second ball side, the shaft being coupled to the ball at the first ball side, and wherein the ball channel opens into the shaft channel at the first ball side.

Aspect 7: Aspect 6, further comprising a wire extending through the ball channel and the shaft channel, the wire extending outward from the ball channel at the second ball side.

Aspect 8: A method of manufacturing a locking system, the method comprising: forming a first compressible material such that the first compressible material comprises a first compressible material bottom surface opposite a first compressible material top surface; forming a second compressible material such that the second compressible material comprises a second compressible material bottom surface opposite a second compressible material top surface; positioning a first securing plate between the first compressible material top surface and the second compressible material bottom surface, the first securing plate comprising a first curved edge forming a first securing plate opening perimeter edge around a first securing plate opening, the first curved edge curving in a first direction away from the second compressible material; positioning a second securing plate adjacent to the second compressible material top surface, the second securing plate comprising a second curved edge, the second curved edge curving in a second direction away from the second compressible material; and positioning a ball at least partially within the first curved edge of the first securing plate and the second curved edge of the second securing plate.

Aspect 9: Aspect 8, wherein the second curved edge forms a second securing plate opening perimeter edge around a second securing plate opening.

Aspect 10: Any of Aspects 8-9 further comprising forming a first fastener hole within the first securing plate and a second fastener hole within the second securing plate, wherein the first fastener hole and the second fastener hole align when the first securing plate is positioned and the second securing plate is positioned.

Aspect 11: Aspect 10, further comprising affixing the first compressible material to the first securing plate.

Aspect 12: Any of Aspects 8-11, further comprising coupling a shaft to the ball, wherein the shaft is coupled to the ball at a second shaft end and extends away from the ball toward a first shaft end.

Aspect 13: Aspect 12, wherein the ball comprises a ball channel and the shaft comprises a shaft channel, the ball channel extending from a first ball side opposite a second ball side, the shaft being coupled to the ball at the first ball side, and wherein the ball channel opens into the shaft channel at the first ball side.

Aspect 14: Aspect 13, further comprising inserting a wire into the ball channel and the shaft channel, wherein the wire extends outward from the ball channel at the second ball side.

Aspect 15: A method of using a locking system, the method comprising: providing a locking system comprising: a first compressible material having a first compressible material bottom surface opposite a first compressible material top surface; a second compressible material having a second compressible material bottom surface opposite a second compressible material top surface; a first securing plate disposed between the first compressible material top surface and the second compressible material bottom surface, the first securing plate comprising a first curved edge forming a first securing plate opening perimeter edge around a first securing plate opening, the first curved edge curving in a first direction away from the second compressible material; a second securing plate adjacent to the second compressible material top surface, the second securing plate comprising a second curved edge, the second curved edge curving in a second direction away from the second compressible material; and a ball positioned at least partially within the first curved edge of the first securing plate and the second curved edge of the second securing plate; aligning a securing surface opening of a securing surface with the first securing plate opening such that the securing surface opening is inward from a first securing plate perimeter edge; and securing a fastener into the securing surface, wherein the fastener extends through the first securing plate and the second securing plate.

Aspect 16: Aspect 15, wherein the fastener further extends through the first compressible material and the second compressible material.

Aspect 17: Any of Aspects 15-16, wherein the locking system further comprises a shaft extending from the ball in the first direction.

Aspect 18: Aspect 17, further comprising inserting the shaft through the securing surface opening.

Aspect 19: Any of Aspects 15-18, wherein the second compressible material transitions from an expanded state to a compressed state when the fastener is secured into the securing surface.

Aspect 20: Any of Aspects 15-19, wherein, based on the fastener being secured into the securing surface, the shaft is locked into a shaft position, the shaft position forming an angle relative to the first securing plate, and wherein the angle is less than 90 degrees.

Aspect 21: An image scanning system for measuring product volume in a container, the system comprising: an image scanning head comprising an image scanning device; a base housing, the image scanning head being rotatably coupled to the base housing, wherein the image scanning head rotates about the base housing in a first direction; and a securing arm, the base housing being rotatably coupled to the securing arm, wherein the base housing rotates about the securing arm in a second direction about perpendicular to the first direction.

Aspect 22: Aspect 21, wherein the securing arm comprises a first securing arm end and a second securing arm end opposite the first securing arm end, and wherein the base housing is rotatably coupled to the securing arm at the first securing arm end.

Aspect 23: Aspect 22, further comprising a shaft coupled to the securing arm at the second securing arm end and extending therefrom.

Aspect 24: Aspect 23, further comprising a controller, the controller positioned within a controller housing, wherein the shaft is coupled to the securing arm at a first shaft end, the shaft extending to a second shaft end, and wherein the controller housing is coupled to the shaft at the second shaft end.

Aspect 25: Any of Aspects 21-24, wherein the image scanning head further comprises a window, the window being transparent to a radiation wavelength emitted by an emitter of the image scanning device.

Aspect 26: Any of Aspects 25, further comprising a brush positioned within a plane of rotation formed from rotation of the base housing about the securing arm, such that the brush engages the window during rotation of the base housing about the securing arm.

Aspect 27: Any of Aspects 21-26, wherein the base housing comprises a first motor configured to rotate the base housing about the securing arm and a second motor configured to rotate the image scanning head about the base housing.

Aspect 28: A method of manufacturing an image scanning system, the method comprising: enclosing an image scanning device within an image scanning head; rotatably coupling the image scanning head to a base housing such that the image scanning head rotates about the base housing in a first direction; and rotatably coupling the base housing to a securing arm such that the base housing rotates about the securing arm in a second direction about perpendicular to the first direction.

Aspect 29: Aspect 28, wherein the securing arm comprises a first securing arm end and a second securing arm end opposite the first securing arm end, and wherein the base housing is rotatably coupled to the securing arm at the first securing arm end.

Aspect 30: Aspect 29, further comprising coupling a shaft to the securing arm at the second securing arm end such that the shaft extends away from the securing arm.

Aspect 31: Any of Aspects 28-30, communicatively coupling a first motor and a second motor to a controller configured to operably control the first motor and the second motor, wherein the first motor is configured to rotate the base housing about the securing arm and the second motor is configured to rotate the image scanning head about the base housing.

Aspect 32: Aspect 31, wherein the controller is positioned within a controller housing and is communicatively coupled to the first and second motor by at least one wire, the wire extending through a securing arm channel to the controller within the controller housing.

Aspect 33: Any of Aspects 28-32, further comprising coupling a window to the image scanning head, the window being transparent to a radiation wavelength emitted by an emitter of the image scanning device.

Aspect 34: Any of Aspects 33, further comprising positioning a brush within a plane of rotation formed from rotation of the base housing about the securing arm, such that the brush engages the window during rotation of the base housing about the securing arm.

Aspect 35: One or more computer storage media storing computer-readable instructions that when executed by a processor, cause the processor to perform a method of measuring product in a container, the method comprising: performing a first scan of a product in a container using an image scanning system, wherein the image scanning system comprises: an image scanning head comprising an image scanning device; a base housing, the image scanning head being rotatably coupled to the base housing, wherein the image scanning head rotates about the base housing in a first direction; and a securing arm, the base housing being rotatably coupled to the securing arm, wherein the base housing rotates about the securing arm in a second direction about perpendicular to the first direction; performing a second scan of product in the container using the image scanning system, wherein the first scan and the second scan are performed by the image scanning device based on rotation of the image scanning head in the first direction and the base housing in the second direction; determining a volume change of the product within the container based on the first scan and the second scan; and providing the volume change to a computing device for display on an interface.

Aspect 36: Aspect 35, wherein the first scan and the second scan collect distance information of the product relative to the image scanning system, and the volume change is determined based on a change in the distance information of the product between the first scan and the second scan.

Aspect 37: Any of Aspects 35-36, further comprising: identifying distance points positioned above an image scanning system position, the distance points identified during the first scan and the second scan; and removing the identified distance points positioned above the image scanning device prior to determining the volume change.

Aspect 38: Any of Aspects 35-37, further comprising: identifying a point cloud during the first scan and the second scan; determining distance points of the point cloud that are greater than or equal to a radius of the container; and removing the determined distance points from the point cloud prior to determining the volume change.

Aspect 39: Any of Aspects 35-38, further comprising: determining a first empty volume of the container from the first scan; and determining a second empty volume of the container from the second scan, wherein the volume change of the product is determined based on the difference between the first empty volume and the second empty volume.

Aspect 40: Aspect 39, further comprising: determining a product occupied volume based on a difference between the total container volume and the first empty volume of the container or the second empty volume of the container; and providing the determined product occupied volume to a computing device for display on an interface.

Any of Aspects 21-40 may be used in conjunction with any of Aspects 1-20.

What is claimed is:

1. A computerized method performed by one or more processors, the method comprising:
    accessing a first point cloud of distance points determined from a first scan of a product in a container using an image scanning system;
    accessing a second point cloud of distance points determined from a second scan of the product in the container using the image scanning system;
    determining terminal edges of the product based on the distance points determined from the first scan and the second scan using a seed distance point;
    removing the distance points within the first point cloud and the second point cloud that correspond to a container wall to identify distance points corresponding to the product;
    determining a volume change of the product within the container based on distance points of the first scan and the second scan that correspond to the product, the volume change being based on the terminal edges of the product; and
    providing the volume change to a computing device for display on an interface.

2. The method of claim 1, further comprising removing outlier distance points determined from the first scan and the second scan prior to determining the volume change.

3. The method of claim 1, further comprising removing duplicate distance points determined from the first scan and the second scan prior to determining the volume change.

4. The method of claim 1, further comprising modifying a distance coordinate corresponding to a distance point of the distance points determined from the first scan or the second scan based on a rotational position of the image scanning system.

5. The method of claim 1, further comprising classifying at least a portion of the distance points as corresponding to one of the product or the container.

6. The method of claim 5, further comprising isolating a product topography using the distance points corresponding to the product based on the classifying.

7. The method of claim 5, wherein classifying the portion of the distance points as corresponding to one of the product or the container comprises comparing the distance points to distance points of a previous scan using the image scanning system.

8. The method of claim 7, wherein the portion of distance points classified is compared to the distance points of the previous scan based on a reference threshold, and wherein the reference threshold is defined based on one or more container parts.

9. A system comprising:
    at least one processor; and
    one or more computer storage media storing computer-readable instructions thereon that, when executed by at least one processor, cause the at least one processor to perform operations comprising:
        performing a first scan of a product in a container using an image scanning system, the image scanning system determining a first point cloud of distance points during the first scan;
        classifying the distance points as corresponding to one of the product or one of the container;
        modifying a distance coordinate corresponding to a distance point of the distance points determined from the first scan based on a rotational position of the image scanning system; and
        generating a topography of the product in the container from the distance points based on the classification.

10. The system of claim 9, further comprising transforming the distance points classified as corresponding to the product from a three-dimensional coordinate value to a one dimensional value to generate the topography of the product.

11. The system of claim 9, wherein generating the topography further comprises triangulating the distance points classified as corresponding to the product.

12. The system of claim 9, further comprising:
    performing a second scan of the product in the container using the image scanning system, the image scanning system determining a second point cloud of distance points during the second scan; and
    determining a volume change of the product within the container based on the distance points of the first scan and the second scan that correspond to the product.

13. The system of claim 9, wherein classifying the distance points as corresponding to one of the product or the container comprises comparing the distance points to distance points of a previous scan using the image scanning system.

14. The system of claim 13, wherein the distance points being classified are compared to the distance points of the previous scan based on a reference threshold, and wherein the reference threshold is defined based on one or more container parts.

15. The system of claim 9, further comprising determining terminal edges of the topography of the product using a seed distance point determined from the distance points.

16. One or more computer storage media storing computer-readable instructions that, when executed by a processor, cause the processor to perform a method comprising:
    performing a first scan of a product in a container using an image scanning system, the image scanning system determining a first point cloud of distance points during the first scan;
    performing a second scan of the product in the container using the image scanning system, the image scanning system determining a second point cloud of distance points during the second scan;
    classifying the distance points determined from the first scan and the second scan as corresponding to one of the product or the container;
    adjusting distance points based on a rotational position of the image scanning system;
    determining a volume change of the product within the container based on distance points classified as corresponding to the product; and
    providing the volume change to a computing device for display on an interface.

17. The media of claim 16, further comprising isolating a product topography using the distance points corresponding to the product based on the classifying.

18. The media of claim 16, wherein classifying the distance points as corresponding to one of the product or the container comprises comparing the distance points to distance points of a previous scan using the image scanning system.

* * * * *